(12) United States Patent
Umekage et al.

(10) Patent No.: US 8,515,692 B2
(45) Date of Patent: Aug. 20, 2013

(54) FLOW RATE MEASURING APPARATUS AND PROGRAM THEREOF

(75) Inventors: Yasuhiro Umekage, Shiga (JP); Hajime Miyata, Nara (JP); Kenichi Kamon, Nara (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 12/447,216

(22) PCT Filed: Jan. 19, 2007

(86) PCT No.: PCT/JP2007/050840
§ 371 (c)(1),
(2), (4) Date: Apr. 24, 2009

(87) PCT Pub. No.: WO2008/050490
PCT Pub. Date: May 2, 2008

(65) Prior Publication Data
US 2009/0271128 A1     Oct. 29, 2009

(30) Foreign Application Priority Data

Oct. 25, 2006  (JP) ................................ 2006-289807
Dec. 14, 2006  (JP) ................................ 2006-336813

(51) Int. Cl.
*G01F 1/708* (2006.01)

(52) U.S. Cl.
USPC .......................................................... 702/45

(58) Field of Classification Search
USPC .................... 702/45, 47; 73/861.27
See application file for complete search history.

(56) References Cited

U.S. PATENT DOCUMENTS

| 7,093,502 B2 | 8/2006 | Kupnik et al. | |
| 2006/0289623 A1* | 12/2006 | Oldham et al. | 235/375 |
| 2007/0007862 A1* | 1/2007 | Adachi et al. | 310/348 |

FOREIGN PATENT DOCUMENTS

| CN | 1453561 A | 11/2003 |
| JP | 07-092001 A | 4/1995 |
| JP | 2000-274668 A | 10/2000 |
| JP | 2001-330489 A | 11/2001 |
| JP | 2002-71421 | 3/2002 |
| JP | 2002-098567 A | 4/2002 |
| JP | 2002-174542 | 6/2002 |
| JP | 2003-149075 | 5/2003 |
| JP | 2003-179027 | 6/2003 |
| JP | 2003-194331 A | 7/2003 |
| JP | 2006-133017 A | 5/2006 |
| JP | 2003-200802 | 8/2006 |
| JP | 2006-200802 A | 8/2006 |

* cited by examiner

OTHER PUBLICATIONS

International Search Report dated Apr. 10, 2007 for PCT/JP2007/050840.

*Primary Examiner* — Mohamed Charioui
(74) *Attorney, Agent, or Firm* — Brinks Hofer Gilson & Lione

(57) ABSTRACT

Object of the present invention is to measure the quantity of a gas flowing through a gas meter and accurately calculate, on a per-appliance basis, the quantity of used gas in each time during which a gas appliance connected to a downstream point is used, without involvement of a waveform pattern. A flow rate measuring apparatus (10) has a flow rate measurement unit that measures a flow rate at given time intervals; an appliance determination unit that calculates a flow difference between flow rates acquired at two arbitrary times by measuring the use of an appliance connected to a downstream point with reference to the flow rate measurement unit, thereby determining an operating appliance; and an appliance flow rate calculation unit that calculates the appliance-specific usage flow rate by switching a calculation method according to the number, types, combinations, and priority levels of currently-operating gas appliances that are results of determination made by the appliance determination unit.

21 Claims, 26 Drawing Sheets

| DESIGNATION OF APPLIANCE | PRIORITY | ROUGH ESTIMATED FLOW RATE [L/hour] |
|---|---|---|
| GAS COOKER | 10 | 100 |
| FAN HEATER | 20 | 120 |
| FLOOR HEATING | 30 | 200 |
| HOT WATER SUPPLY | 40 | 700 |

FLOW RATE MEASURING APPARATUS AND PROGRAM THEREOF

TECHNICAL FIELD

The present invention relates to a technique for determining a gas appliance being used in order to provide a new fee or service appropriate for an appliance being used or the way of using the appliance, such as a gas-appliance-specific fee, and the like, in connection with a gas meter that is placed at an inlet of a gas supply line in each house and that measures a gas flow rate.

BACKGROUND ART

In relation to a flow rate measuring apparatus of this type and a program thereof, there has hitherto been proposed a gas meter (a flow rate measuring apparatus) that enables setting of a gas-appliance-specific fee system and a time-of-day fee system by use of the fact that a range of a gas flow rate is limited by a gas appliance (see; for instance, Patent Document 1).

The related-art flow rate measuring apparatus described in Patent Document 1 enables setting of a gas-appliance (group)-specific fee system and a time-of-day fee system as follows. Of gas appliances used in a common household, a water heater, a bath boiler, and the like, used for supplying hot water entail consumption of large quantity of used gas (amounts of consumption) per hour, whilst a gas cooker and a rice cooker in a kitchen, a gas heater, a gas heat pump (GHP), and the like, entail consumption of small quantity of used gas (amounts of consumption). Gas appliances that consume intermediate amount of gas with respect to the above-described quantity of used gas (amounts of consumption) are classified into special appliances; hence, a fee is set for each flow rate category of a certain range and adjusted, whereby a gas-appliance (group)-specific fee corresponding to a unit flow category can be set. For instance, a time-of-day fee system is then applied to a unit flow category including a specific appliance, such as a bath boiler, whereby user service can be further diversified, and gas companies, and the like, can implement sales strategies for increasing quantity of used gas.

The following has also been proposed as a mechanism for determining the type of an appliance operated (see; for instance, Patent Document 2).

FIG. 26 shows a related-art gas meter (flow rate measuring apparatus) described in Patent Document 2. As shown in FIG. 26, the related-art flow rate measuring apparatus is constituted by a flow rate measurement unit 1 that measures the flow rate of gas flowing through a gas passage; a flow rate storage unit 2 that stores the gas flow rate measured by the flow rate measurement unit 1; an appliance determination unit 3 that determines a currently-used appliance from the gas flow rate measured by the flow rate measurement unit 1; a flow rate integration unit 4 that integrates the gas flow rate measured by the flow rate measurement unit 1; a flow rate report unit 5 that displays a value computed by the flow rate integration unit 4; a flow rate pattern table 6 that categorizes, for each control step (an ignition time, an initial transition period, and a period of stabilization), partial flow rate patterns into which there are divided a series of gas flow rate patterns stemming from combustion control in connection with a total number of gas appliances used in each household; and an appliance table 7 that determines, as correspondence, combinations of a plurality of types of gas appliances with corresponding partial flow rate patterns.

The appliance determination unit 3 has a control step determination module 3a that determines the respective control steps from a detected gas flow rate pattern (a flow rate waveform against time); a partial flow rate pattern extraction module 3b that extracts a partial flow rate pattern from a gas flow rate waveform divided for each control step; and a matching module 3c that extracts a matched gas appliance from the flow rate pattern table 6 and the appliance table 7 by taking the partial flow rate pattern as a clue.

When a gas combustion appliance is newly activated, a start time of use and a result of measurement subsequently performed by the flow rate measurement unit 1 are stored in the flow rate storage unit 2 by the configuration, in order to make it possible to specify a waveform of a gas flow rate with respect to a time. The control step module 3a analyzes a stored waveform of the gas flow rate (a change over time in gas flow rate), thereby determining correspondence between respective periods of the waveform to respective control steps of combustion control. Moreover, the partial flow rate extraction module 3b divides the waveform of the gas flow rate for each control step and extracts characteristic data about the thus-divided partial flow rate patterns.

Finally, the characteristic data extracted by the matching module 3c are compared with the flow rate patterns of the respective control steps stored in the flow rate pattern table 6, thereby searching a matched pattern, and use of a gas appliance is determined from how the characteristic data pertaining to the three control steps match the flow rate pattern table 6. A determination as to how a match arises is performed by use of the appliance table 7.

Since the currently-used appliance can be thereby determined, optimum operation can be monitored for each appliance by utilization of a determination result.

A flow rate measuring apparatus described in Patent Document 3 is also available as the related-art flow rate measuring apparatus. As shown in FIG. 27, a flow rate measuring apparatus described in Patent Document 3 has a gas flow rate measurement unit 1001 that measures the flow rate of gas flowing through a gas passage; a flow rate increase detection unit 1002 that detects an increase in flow rate from a measurement result; a flow rate increase/decrease detection unit 1003 that detects an instantaneous incremental/decremental change in gas flow rate stemming from an increase in flow rate; an appliance determination unit 1004 that determines activation of a new gas combustion appliance at the time of detection of an instantaneous incremental/decremental change; and a flow rate registration unit 1005 that registers an increment in gas flow rate detected by the gas flow rate increase detection unit 1002 as an increment in gas flow rate stemming from initiation of use of the new gas appliance (see; for instance, Patent Document 3).

Attention is paid to a phenomenon of a stable gas flow rate being achieved after undergoing instantaneous increase or decrease when use of a new gas appliance is activated, and initiation of use of a new gas appliance is determined at the time of determination of an incremental/decremental change by the foregoing configuration, whereby initiation of use of a new gas appliance is determined by a simple method, and deactivation of the appliance can be determined from a decreasing change in flow rate.

Patent Document 1: JP-A-2002-71421
Patent Document 2: JP-A-2003-179027
Patent Document 3: JP-A-2002-174542

DISCLOSURE OF THE INVENTION

Problem that the Invention is to Solve

In the related-art flow rate measuring apparatus described in connection with Patent Document 1, specific determination of an appliance is ambiguous, and difficulty is encountered in setting a fee that is easier for consumers to understand and provides the consumers with convenience, such as charging of a fee for a specific appliance. For example, in a case where a flow rate of gas used by a gas heater is integrated and where a charge for only the flow rate of gas is taken as a discount usage, specific determination of an appliance made by the related-art technique is ambiguous, and the gas flow rate can be calculated solely as the quantity of used gas for a low-consumption appliance group including a gas cooker, a rice cooker, and the like.

The related-art flow rate measuring apparatus described in connection with Patent Document 2 can determine the appliance being used; however, previous registration of a flow rate pattern is required. In addition, in many cases, a gas appliance is used in conjunction with a plurality of other gas appliances rather than being used alone. Therefore, the patterns do not always exhibit simple change (proportional control, constant control, or step control). For these reasons, in a case where an attempt is made to calculate gas flow rates of respective appliances by the related-art configuration when a plurality of appliances are simultaneously used, gas flow rate patterns must be prepared taking into account possible combinations of appliances. Since the number of combinations becomes enormous, the related-art flow rate measuring apparatus encounters a problem of determining a plurality of appliances resulting in consumption of much time and being extremely difficult. Much time being consumed for determination (processing) means that such long processing is necessary and hence means that it requires electric power.

Times at which a gas appliance starts operation, stops, and undergoes control are arbitrary. Preparation of enormous combinations of flow rate patterns is impossible. If a determination is made by limited patterns, an error will arise accordingly.

In the related-art configuration described in connection with Patent Document 3, deactivation of a new gas appliance is determined based on a decremental change in gas flow rate corresponding to an increase in gas flow rate induced by initiation of use of the gas appliance. Therefore, when the quantity of gas used by the gas appliance is changed in the middle of usage of the gas appliance, there will arise a problem of incapability of determining the deactivated appliance.

The present invention resolves the drawback in the related art and provides a flow rate measuring apparatus that can accurately compute an appliance-specific quantity of used gas without having all waveform patterns in connection with an appliance determined to have been activated by appliance determination unit.

Means for Solving the Problem

In order to solve the drawbacks of the related art, a flow rate measuring apparatus and its program of the present invention include a flow rate measurement unit that measures at given time intervals the flow rate of gas flowing through a passage and that outputs measurement results as flow rate data; a computing unit that calculates a differential value between flow rate data output from the flow rate measurement unit; an appliance determination unit that determines use of an appliance from the differential value computed by the computing unit; and an appliance flow rate calculation unit that calculates the appliance-specific usage flow rate by switching a calculation method in accordance with a result of determination made by the appliance determination unit.

According to the present invention, the number and types of currently-operating appliances are analyzed based on a result of determination made by the appliance determination unit. When a plurality of appliances are operating, the combination of the appliances is analyzed. The highest-precision calculation method is adopted, as required, for a method of calculating the appliance-specific usage flow rate based on an analysis result. Hence, when compared with a case where the usage flow rate by an appliance is determined by only a comparison between flow rate patterns regardless of the result of determination made by the appliance determination unit (operating appliances), the appliance-specific gas usage flow rate can be accurately calculated.

A flow rate measuring apparatus of the present invention has a flow rate measurement unit that measures the flow rate in a passage; a differential flow rate detection unit that calculates a differential flow rate from flow rates measured by the flow rate measurement unit; an activated appliance determination unit that determines an appliance activated by being connected to the passage by the differential flow rate; an instantaneous flow rate estimation unit that calculates an instantaneous flow rate of an activated appliance by use of the differential flow rate; and a deactivated appliance determination unit that determines a deactivated appliance, based on the instantaneous flow rate calculated by the instantaneous flow rate estimation unit.

Thereby, an instantaneous flow rate of an activated appliance is successively known by estimating an instantaneous flow rate based on a differential flow rate. Hence, it is possible to determine which one of operating appliances is deactivated with high accuracy, by detecting a differential flow rate achieved when an appliance is deactivated.

A flow rate measuring apparatus of the present invention also has a flow rate measurement unit that measures a flow rate of fluid flowing through a passage; an activated appliance determination unit that determines an appliance to be used by being connected to the passage, based on an arbitrary specific interval differential flow rate of a flow rate measured at predetermined timing intervals by the flow rate measurement unit; a deactivated appliance determination unit that determines a deactivated appliance based on the specific interval differential flow rate and that selects and determines a deactivated appliance from among activated appliances based on deactivation determination conditions; and an appliance correspondence unit that defines correspondence between an activated appliance and a deactivated appliance.

Since a deactivated appliance can be determined based on two pieces of information; namely, information about activated appliances and flow rate information, the range of appliances to be selected is narrow, and therefore a deactivated appliance can be determined with superior accuracy.

Advantages of the Invention

The flow rate measuring apparatus and its program of the present invention analyze the number and types of currently-operating appliances based on a result of determination made by the appliance determination unit. When a plurality of appliances are operating, the combination of the appliances is analyzed. A method of calculating an appliance-specific usage flow rate is changed, as necessary, based on an analysis result. Hence, when compared with a case where the usage flow rate by an appliance is calculated by only a comparison between flow rate patterns regardless of the result of determination made by the appliance determination unit (operating appliances), the appliance-specific gas usage flow rate can be accurately calculated.

The flow rate measuring apparatus of the present invention also has an instantaneous flow rate estimation unit that calculates an instantaneous flow rate of an activated appliance by use of the differential flow rate; and a deactivated appliance determination unit that determines a deactivated appliance, based on the instantaneous flow rate calculated by the instantaneous flow rate estimation unit. As a result, an instantaneous flow rate of an activated appliance is successively known by estimating an instantaneous flow rate based on a differential flow rate. Hence, it is possible to determine which one of operating appliances is deactivated with high accuracy, by detecting a differential flow rate achieved when an appliance is deactivated.

The flow rate measuring apparatus of the present invention also has an appliance correspondence unit that selectively determine any from among activated appliances under deactivation determination conditions, thereby defining correspondence between an activated appliance and a deactivated appliance. Since a deactivated appliance can be determined based on two pieces of information; namely, information about activated appliances and flow rate information, the range of appliances to be selected is restricted, and therefore a deactivated appliance can be determined with superior accuracy.

DESCRIPTIONS OF THE REFERENCE NUMERALS

Figure 1:
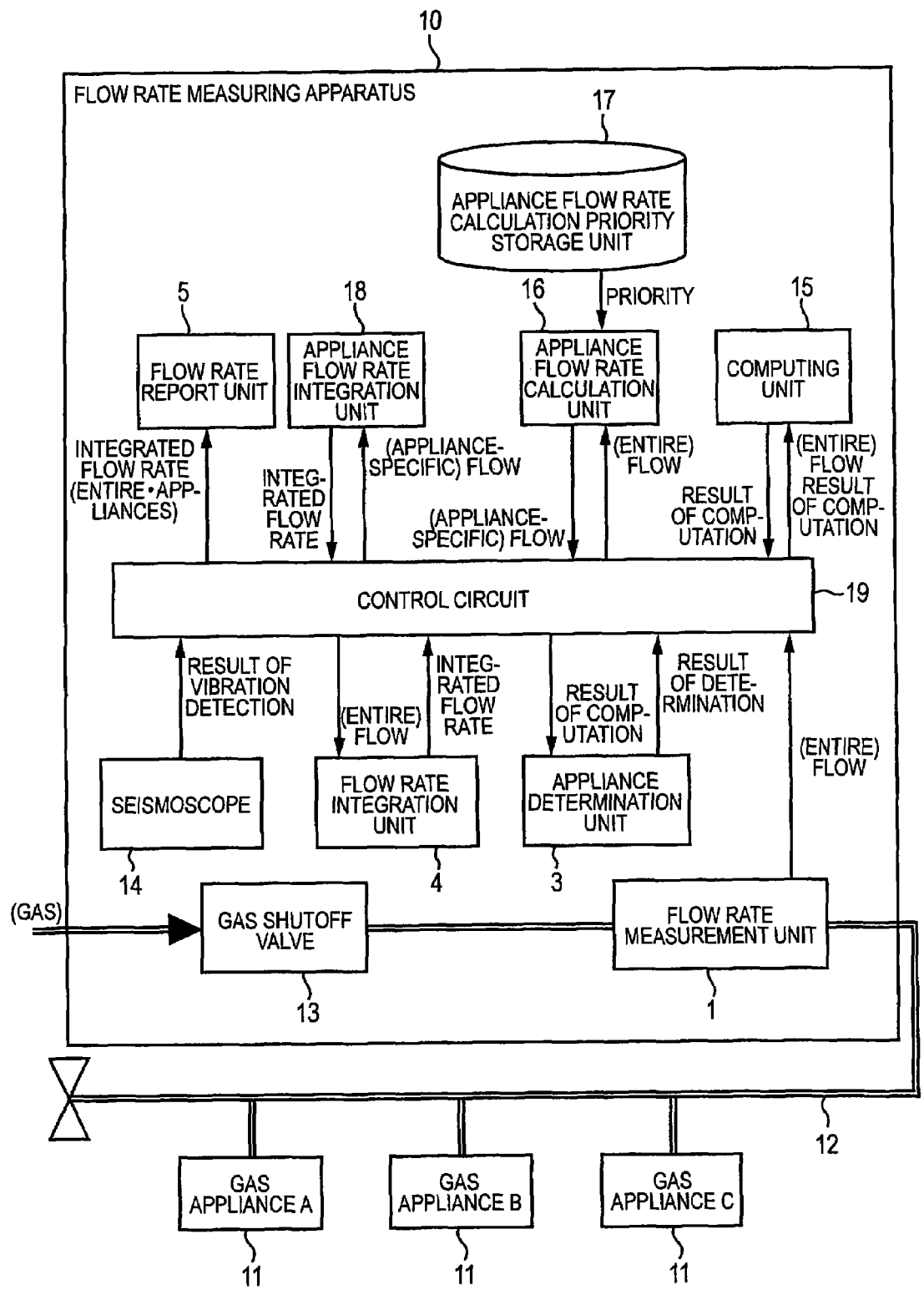
FIG. 1 is a block diagram of a flow rate measuring apparatus of a first embodiment of the present invention.

1 FLOW RATE MEASUREMENT UNIT
2 FLOW RATE STORAGE UNIT
3 APPLIANCE DETERMINATION UNIT
4 FLOW RATE INTEGRATION UNIT
5 FLOW RATE REPORT UNIT
6 FLOW RATE PATTERN TABLE
7 APPLIANCE TABLE
10 FLOW RATE MEASURING APPARATUS
11 GAS APPLIANCE
15 COMPUTING UNIT
16 APPLIANCE FLOW RATE CALCULATION UNIT
17 FLOW RATE CALCULATION PRIORITY STORAGE UNIT
18 APPLIANCE FLOW RATE INTEGRATION UNIT
19 CONTROL CIRCUIT
1006 PASSAGE
1007 ULTRASONIC FLOW METER (FLOW RATE MEASUREMENT UNIT)
1008 DIFFERENTIAL FLOW RATE DETECTION UNIT
1009 ACTIVATED APPLIANCE DETERMINATION UNIT
1010 INSTANTANEOUS FLOW RATE ESTIMATION UNIT
1011 DEACTIVATED APPLIANCE DETERMINATION UNIT
1012 APPLIANCE CORRESPONDENCE UNIT
1013 GAS PIPELINE
1014 GAS METER (FLOW RATE MEASURING APPARATUS)
1015 PASSAGE SHUTOFF VALVE
1020 GAS COOKING APPLIANCE
1021 FAN HEATER
2006 PASSAGE
2007 ULTRASONIC FLOW METER
2008 ACTIVATED APPLIANCE DETERMINATION UNIT
2009 DEACTIVATED APPLIANCE DETERMINATION UNIT
2010 APPLIANCE CORRESPONDENCE UNIT

2011 APPLIANCE-SPECIFIC FLOW RATE CALCULATION UNIT
2012 STORAGE MEMORY
2013 GAS PASSAGE
2014 GAS METER
2015 PASSAGE SHUTOFF VALVE

BEST MODES FOR IMPLEMENTING THE INVENTION

A first invention is characterized by including a flow rate measurement unit that measures at given time intervals the flow rate of gas flowing through a passage and that outputs measurement results as flow rate data; a computing unit that calculates a differential value between flow rate data output from the flow rate measurement unit; an appliance determination unit that determines use of an appliance from the differential value computed by the computing unit; and an appliance flow rate calculation unit that calculates the appliance-specific usage flow rate by switching a computing method in accordance with a result of determination made by the appliance determination unit.

The number and types of currently-operating appliances are analyzed by the determination result from by the appliance determination unit. When a plurality of appliances are operating, a combination of the appliances is analyzed, and the most accurate computing method is appropriately adopted, based on a result of analysis, as a method for calculating the appliance-specific usage flow rate. Accordingly, the usage flow rate can be more accurately calculated as compared with a case where the usage flow rate is calculated by only a comparison between flow rate patterns regardless of a result of determination (of operating appliances) performed by the appliance determination unit.

A second invention is characterized in that the appliance flow rate calculation unit has a plurality of calculation processing units that calculate a flow rate in predetermined steps; and a usage flow rate for each appliance is calculated by switching the calculation processing units based on number of times of flow rate measurements performed by the flow rate measurement unit when the appliance determination unit has detected the differential values computed by the computing unit or during a time from when a transition to a state of determination of an appliance is effected and to when processing leaves the state of determination as well as based on the number of gas appliances used.

In a case where two or more appliances are operating, calculating a waveform for each appliance as in the related entails use of a change in flow rate (herein called a flow difference) measured by the flow rate measurement unit. The present invention enables omission of wasteful processing by an amount corresponding to elimination of operation for calculating a waveform, so that power exhaustion can be diminished.

A third invention is characterized in that the appliance flow rate calculation unit determines a sequence in which a plurality of operating appliances are subjected to flow rate calculation, based on flow rate calculation priority storage unit previously set under predetermined conditions; and calculates a usage flow rate by an appliance in a decreasing sequence of priority level from an appliance with a high priority level.

In relation to; for instance, a gas cooker and a fan heater used by the user, in a case where the gas cooker is determined to be higher than the fan heater in terms of a priority level, the gas cooker does not cause any substantial change in the usage flow rate when once operated. Conversely, the fan heater induces a change in the usage flow rate. Therefore, so long as the usage flow rate used by the gas cooker is first calculated and a resultant value is subtracted from a value measured by the flow rate measurement unit, the usage flow rate used by the fan heater can be calculated without reference to a flow rate pattern. Therefore, the usage flow rate can be calculated with superior accuracy.

A fourth invention is characterized in that a higher priority level is set as the usage flow rate becomes smaller.

When a large-flow appliance and a small-flow appliance are operating, the large-flow appliance is larger in terms of a range (ratio) of change. Hence, a flow rate change (control) arising in the small-flow appliance when both of the appliances are operating does not appear in a waveform because of a flow rate change (control) arising in the large-flow appliance, and the appliance determination unit cannot determine the flow rate change in the small-flow appliance. Specifically, use of a priority level can be prevented in such a way that control of the large-flow appliance is erroneously recognized as control of the small-flow appliance.

A fifth invention is characterized in that a higher priority level is set on an appliance which is less frequently changed in connection with the usage flow rate after activation.

In relation to; for instance, a gas cooker and a fan heater used by the user, in a case where the gas cooker whose flow rate is less frequently changed after activation than is the fan heater is determined to be higher than the fan heater in terms of a priority level, the gas cooker does not cause any substantial change in the usage flow rate when once operated. Conversely, the fan heater induces a change in the usage flow rate. Therefore, so long as the usage flow rate used by the gas cooker is first calculated and a resultant value is subtracted from a value measured by the flow rate measurement unit, the usage flow rate used by the fan heater can be calculated without reference to a flow rate pattern. Therefore, the usage flow rate can be calculated with superior accuracy.

A sixth invention is characterized in that, when a large flow rate usage appliance starts operation while a small flow rate usage appliance is in operation, the appliance flow rate calculation unit compares flow rates measured by the flow rate measurement unit immediately before and after operation of the large flow rate usage appliance, to thus calculate a usage flow rate used by the small flow rate usage appliance in the middle of the large flow rate usage appliance being in operation.

When a large-flow appliance and a small-flow appliance are operating, the large-flow appliance is larger in terms of a range (ratio) of change. Hence, a flow rate change (control) arising in the small-flow appliance when both of the appliances are operating does not appear in a waveform because of a flow rate change (control) arising in the large-flow appliance, and the appliance determination unit cannot determine the flow rate change in the small-flow appliance. Therefore, the usage flow rate used by the small flow rate usage appliance in the middle of the large flow rate usage appliance being in operation is calculated from the flow rate measured by the flow rate measurement unit immediately before and after operation of the large flow rate usage appliance. Thus, when compared with a case where the usage flow rate used by an appliance is calculated by only a comparison between flow rate patterns regardless of the result of determination (operating appliances) made by the appliance determination unit, the usage flow rate can be accurately calculated.

A seventh invention is particularly a program that implements at least a portion of the flow rate measuring functions of at least one of the first through sixth inventions by a computer. Since the invention is a program, at least a portion of the flow rate measuring apparatus of the present invention can be readily implemented by causing the program to cooperatively operate with hardware resources having a CPU (or a microcomputer), RAM, ROM, a storage device, an I/O, and the like, such as electric/information equipment, a computer, and a server. Moreover, delivery and installation of a program can be readily performed by recording the program on a recording medium or distributing the program by use of a communication line.

An eighth invention is configured by including a flow rate measurement unit that measures the flow rate in a passage; a differential flow rate detection unit that calculates a differential flow rate from flow rates measured by the flow rate measurement unit; an activated appliance determination unit that determines an appliance activated by being connected to the passage by the differential flow rate; an instantaneous flow rate estimation unit that calculates an instantaneous flow rate of an activated appliance by use of the differential flow rate; and a deactivated appliance determination unit that determines a deactivated appliance, based on the instantaneous flow rate calculated by the instantaneous flow rate estimation unit. Since an instantaneous flow rate of an activated appliance is successively known by estimating an instantaneous flow rate based on a differential flow rate, it is possible to determine which one of operating appliances is deactivated with high accuracy, by detecting a differential flow rate achieved when an appliance is deactivated.

A ninth invention; particularly, the instantaneous flow rate estimation unit of the flow rate measuring apparatus of the eighth invention is configured so as to calculate an instantaneous flow rate of an activated appliance determined based on a value of the differential flow rate. An instantaneous flow rate of an appliance that involves a large differential flow rate after start of operation and an instantaneous flow rate of an appliance that involves a small differential flow rate after start of operation can be calculated separately. An appliance can be specified by use of a characteristic of flow rate control of an appliance, and hence an instantaneous flow rate can be calculated with superior accuracy.

A tenth invention; particularly, the instantaneous flow rate estimation unit of the flow rate measuring apparatus of the eighth and ninth inventions can estimate an instantaneous flow rate of an appliance being used, by adding or subtracting a differential flow rate acquired later to or from a differential flow rate achieved when the activated appliance determination unit has determined activation. An instantaneous flow rate can be successively calculated by adding or subtracting a subsequently-acquired differential flow rate in or from an initial start flow rate.

An eleventh invention; particularly, the deactivated appliance determination unit of the flow rate measuring apparatus of the eighth and ninth inventions determines a deactivated appliance by comparing an instantaneous flow rate calculated by the instantaneous flow rate estimation unit with a differential flow rate achieved at the time of deactivation. The successively-calculated instantaneous flow rate comes to a differential flow rate for the time of deactivation, and the appliance is deactivated. Therefore, the deactivated appliance can be determined with superior accuracy.

A twelfth invention; particularly, the instantaneous flow rate estimation unit of the flow rate measuring apparatus of the eighth and ninth inventions compares a total flow rate measured by the flow rate measurement unit with a sum of flow rates estimated by the instantaneous flow rate estimation unit and makes a correction to the sum, thereby calculating an instantaneous flow rate. Therefore, an estimated instantaneous flow rate can be calculated at all times with superior accuracy.

A thirteenth invention; particularly, the flow rate measuring apparatus of the eighth to twelfth inventions are configured so as to employ an ultrasonic flow meter corresponding to the instantaneous flow measurement unit serving as the flow rate measurement unit. A flow rate can be measured at short time intervals and predetermined time intervals; hence, high-precision determination of an appliance and calculation of an appliance-specific flow rate are made possible.

A fourteenth invention is configured so as to include a flow rate measurement unit that measures a quantity of fluid flowing through a passage; an activated appliance determination unit that determines an appliance to be used by being connected to the passage, based on an arbitrary specific interval differential flow rate of a flow rate measured at predetermined timing intervals by the flow rate measurement unit; a deactivated appliance determination unit that determines a deactivated appliance based on the specific interval differential flow rate and that selects and determines a deactivated appliance from among activated appliances based on deactivation determination conditions; and an appliance correspondence unit that defines correspondence between an activated appliance and a deactivated appliance. Since a deactivated appliance can be determined based on two pieces of information; namely, information about activated appliances and flow rate information, the range of appliances to be selected is narrow, and therefore a deactivated appliance can be determined with superior accuracy.

A fifteenth invention is configured so as to include a flow rate measurement unit that measures a flow rate of a fluid flowing through a passage; an activated appliance determination unit for determining, based on an arbitrary specific interval differential flow rate calculated from a flow rate measured by the flow rate measurement unit at predetermined time intervals, an appliance to be used by being connected to the passage; a deactivated appliance determination unit that determines a deactivated appliance based on the specific interval differential flow rate and that determines an activated appliance corresponding to the deactivated appliance under predetermined conditions, thereby defining correspondence between appliances. Only activation of an appliance is detected by the activated appliance determination unit, and an activated appliance is determined since a deactivated appliance is determined, whereby an appliance can be determined with more accuracy.

A sixteenth invention; particularly, a determination is performed by taking deactivation determination conditions for the flow rate measuring apparatus of the fourteenth and fifteenth inventions as deactivation determination conditions for determining an appliance by an absolute value of a differential flow rate. An appliance greatly differing from another appliance in terms of a gas flow rate, as in the case of a gas hot water supply, can be quickly determined by an absolute value of a differential flow rate. Determination of such an appliance can be separated from determination of another low-flow appliance, so that the accuracy of determination of a low-flow appliance can be enhanced.

A seventeenth invention; particularly, the deactivated appliance determination unit of the flow rate measuring apparatus of the fourteenth and fifteenth inventions makes a determination as deactivation determination conditions for specifying an appliance by a flow rate measured after deactivation. Even when it is difficult to make a determination by only a differential flow rate, operating appliances are determined from measured flow rates acquired after deactivation of an appliance, thereby estimating the deactivated appliance.

Thus, even when an appliance is not recognized by the differential flow rate, the nature of the appliance can be determined.

An eighteenth invention; particularly, the deactivated appliance determination unit of the flow rate measuring apparatus of the fourteenth, sixteenth, and seventeenth inventions determines an appliance of interest as an unknown appliance when there is no activated appliance in spite of determination of deactivation. As a result, appliances can be determined when a plurality of appliances are simultaneously activated.

A nineteenth invention; particularly, the deactivated appliance determination unit of the flow rate measuring apparatus of the fourteenth and fifteenth inventions makes, when there still remains an activated appliance despite the measured flow rate having come to zero, a determination that an activated appliance is deactivated at a point in time when the measured flow rate has come to zero. Thus, when a plurality of appliances are simultaneously deactivated, the deactivated appliances can be determined.

In a twentieth invention, determination conditions can be separated for a case where a large-flow appliance is operating and a case where a low-flow appliance is operating, by changing the deactivation determination conditions according to an activated appliance determined by, particularly, the activated appliance determination unit of the flow rate measuring apparatus of the fourteenth to nineteenth inventions. The accuracy of determination performed in the middle of operation of the low-flow appliance can be enhanced.

A twenty-first invention; particularly, the flow rate measuring apparatus of the fourteenth to twentieth inventions are configured so as to use an ultrasonic flow meter corresponding to the instantaneous flow rate measurement unit serving as the flow rate measurement unit. A flow rate can be measured at short time intervals and predetermined time intervals; hence, highly-precision determination of an appliance and calculation of an appliance-specific flow rate are made possible.

Embodiments of the present invention will be described hereinbelow by reference to the drawings. However, the present invention is not restricted by the embodiments.

First Embodiment

FIG. 1 is a block diagram of a gas meter serving as a flow rate measuring apparatus of a first embodiment of the present invention.

In FIG. 1, reference numeral 10 designates a flow rate measuring apparatus that is placed at an arbitrary point on a gas supply line, and a gas appliance 11 or more positioned in each user's house are connected to a downstream pipe of the gas supply line.

A gas shutoff valve 13 and a gas flow rate measurement unit 1, which are disposed in a passage 12 connected to a gas pipe, are accommodated in the flow rate measuring apparatus 10, and the gas usage flow rate is calculated by subjecting a flow rate signal detected by the flow rate measurement unit 1 to arithmetic processing.

A seismoscope 14 that detects vibrations, such as an earthquake, is also incorporated and arranged so as to shut off the gas passage 12 by activating the gas shutoff valve 13 upon detection of vibrations of a predetermined level or more.

Additionally incorporated are gas appliance determination units 3 that specifies which one of the gas appliances 11 connected to the gas passage 12 is used by use of a flow rate signal detected by the flow rate measurement unit 1; a flow rate integration unit 4 that integrates the quantity of gas measured by the flow rate measurement unit 1; a computing unit 15 that computes a flow difference between flow data that are measured at given time intervals and output by the flow rate measurement unit 1; an appliance flow rate calculation unit 16 that calculates the quantity of gas used by the appliances 11; a flow rate calculation priority level storage unit 17; an appliance flow rate integration unit 18 that integrates, on a per-appliance basis, the flow rate of gas flowing in the gas appliance 11 calculated by the appliance flow rate calculation unit 16; a flow rate report section 5 for reporting the entire used gas flow rate and the gas usage quantity for each appliance 11, which have been calculated by the flow rate integration unit 4 and the appliance flow rate integration unit 18; a control circuit 19 that performs activation of the seismoscope 14, determination of an appliance, safety function, and other comprehensive control processing; and a battery (not shown) serving as power source for these units.

Figures 2, 3:
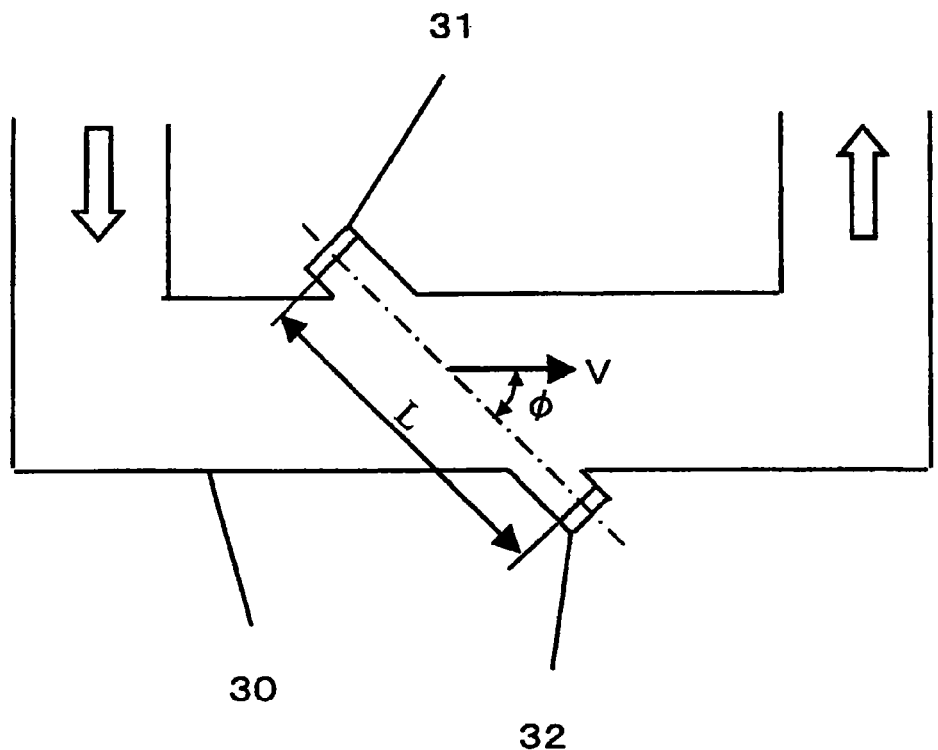
FIG. 2 is a data structure chart of a flow rate calculation priority storage unit of the first embodiment of the present invention.
FIG. 3 is a block diagram of a flow rate measurement unit of the first embodiment of the present invention.

Designations of appliances, appliance flow rate calculation priority levels expressed by numerals, and rough estimated quantity of gas used [L/hour] when target appliances are started to be activated are stored a shown in FIG. 2 in the form of a table in the flow rate calculation priority level storage unit 17. Incidentally, in the present embodiment, priority levels are previously determined, such as a priority level 10 for a gas cooker, 20 for a fan heater, 30 for a floor heating, and 40 for a hot water supply, and an appliance with a small number is taken as a gas appliance with a high priority level. The priority level also relates to the frequency of control of a gas appliance. For example, in relation to a gas cooker, a frequency with which the quantity of gas is controlled by the user solely for adjusting the size of a flame is low (a chance of control being performed is basically low when adjustment is performed immediately after initiation of operation), and therefore the gas cooker is determined to be higher than the fan heater in terms of a priority level.

Further, the gas appliances are not limited to those mentioned above. When gas appliances, other than those mentioned above, such as a gas heater and a gas rice cooker, are handled, the designation of a gas appliance and its priority level expressed by a numeral are added to the table in the flow rate calculation priority level storage unit 17.

Ultrasonic measurement unit is used for the flow rate measurement unit 1 of the present invention; however, another flow rate measurement method, such as a fluidic method, is available, so long as the method enables performance of continual measurement at given cycles within a short period of time.

Operation of the flow rate measuring apparatus of the first embodiment is described hereunder.

First, ultrasonic flowmetry performed by the flow rate measurement unit 1 is described by reference to FIG. 3. A measurement passage 30 provided within the gas passage 12 has a rectangular cross section, and a pair of ultrasonic transceivers 31 and 32 are obliquely embedded, in a mutually-opposing fashion at an angle φ between upstream and downstream positions, with the measurement passage 30 sandwiched therebetween, in the passage and in respective wall surfaces located perpendicular to a direction in which a gas flows through the measurement passage 30. Ultrasonic waves are mutually transmitted and received between the ultrasonic transceivers 31 and 32 by measurement control unit (not shown) of the flow rate measurement unit 1, thereby measuring at given intervals a difference between propagation times of ultrasonic waves achieved in both forward and reverse directions with respect to the flow of a fluid and outputting measurement results as a propagation time difference signal.

Upon receipt of the propagation time difference signal, calculation unit (not shown) calculates a flow speed and flow rate of a fluid to be measured. An operation expression is provided below.

In FIG. 3, provided that reference symbol L designates an object distance; t1 designates a time of transmission from an upstream position; t2 designates a time of transmission from a downstream position; C designates sonic velocity, flow speed V can be calculated by the following equation.

$$V=(L/2 \cos \phi)\cdot((1/t))-(1/t2)) \quad \text{Equation (1)}$$

A time interval of measurement can be set within a range where transmission and receipt of ultrasonic waves can be performed, and measurement is performed at an interval of two seconds in the present embodiment. An additional reduction in time interval is theoretically feasible. Since some gas appliances are activated at a period of time that is shorter than two seconds, a reduction in measurement time interval is advantageous in terms of instantaneous determination of an appliance. However, a reduction in measurement interval raises a problem of an increase in consumption of a battery. In contrast, when the measurement interval equivalent to a measurement interval of a membrane method employed in a related-art gas meter becomes intervals of order of two-digit seconds, the appliance determination unit 3 of the present invention encounters difficulty in determining the gas appliance 11 (performing determination of an appliance). Therefore, in the present invention, measurement is practiced at an interval of two seconds that is well balanced in terms of cost and the performance of appliance determination.

Figure 4:
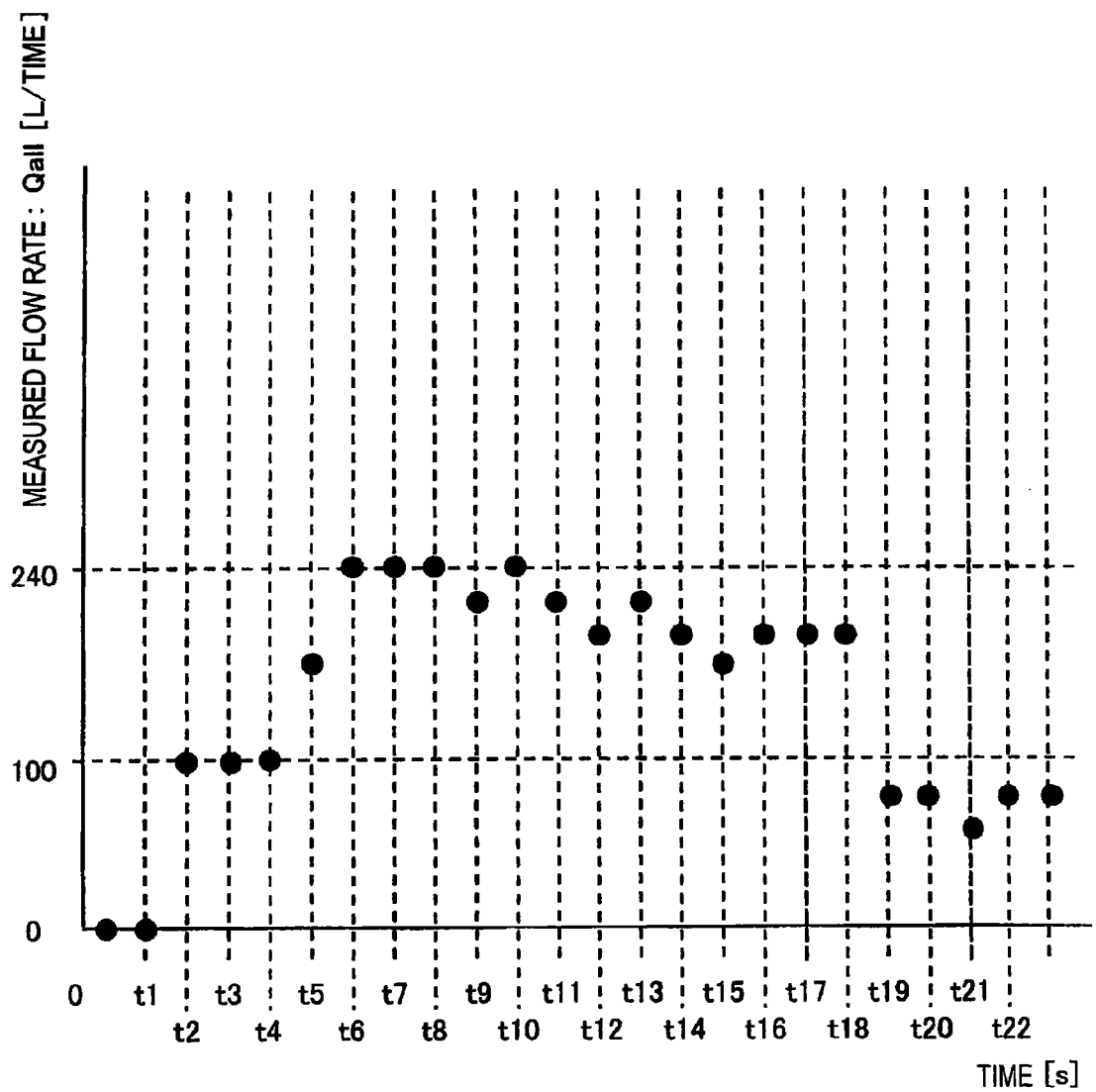
FIG. 4 is a view plotting the flow rate measured by the flow rate measurement unit of the first embodiment of the present invention.
Figure 5:
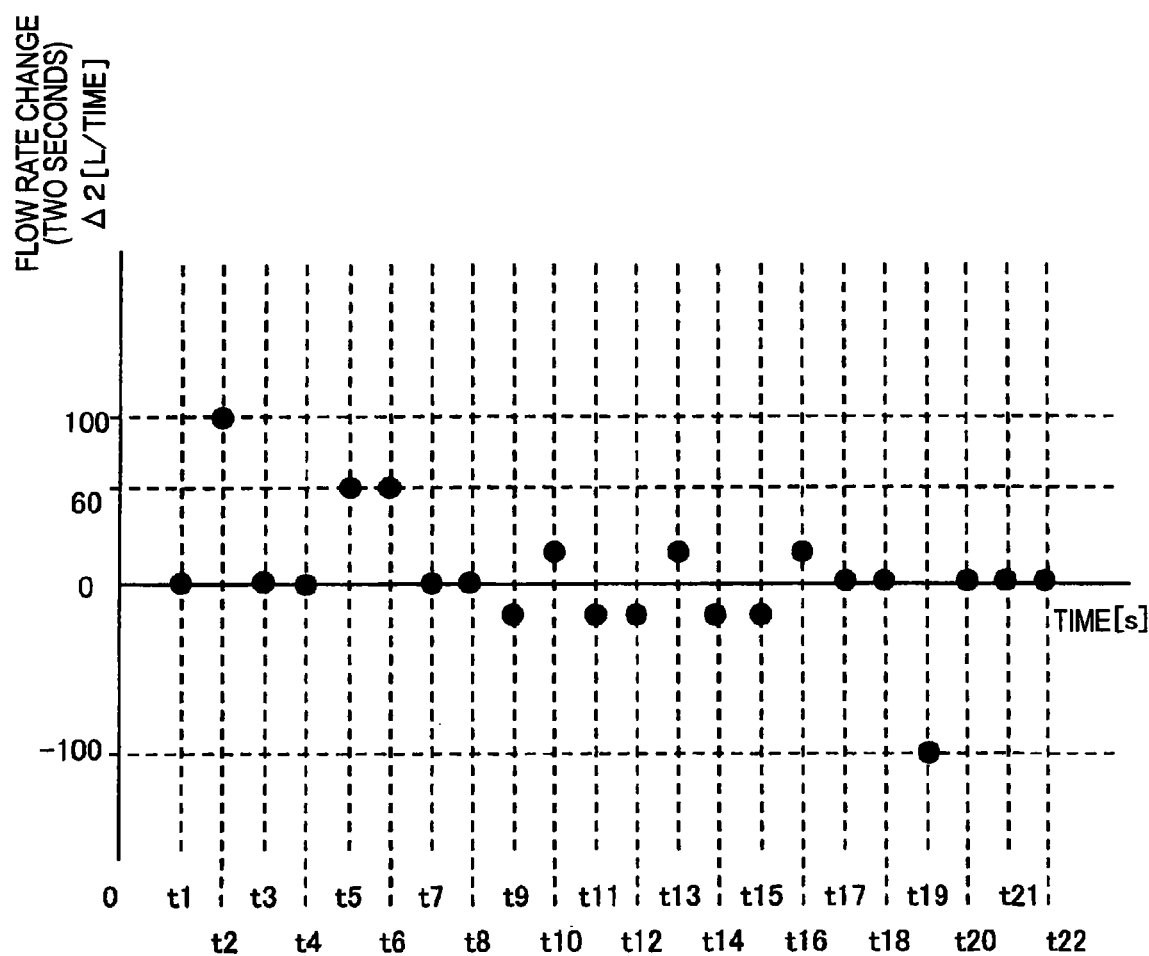
FIG. 5 is a view plotting the amount of change computed by a computing unit of the first embodiment of the present invention.
Figure 6:
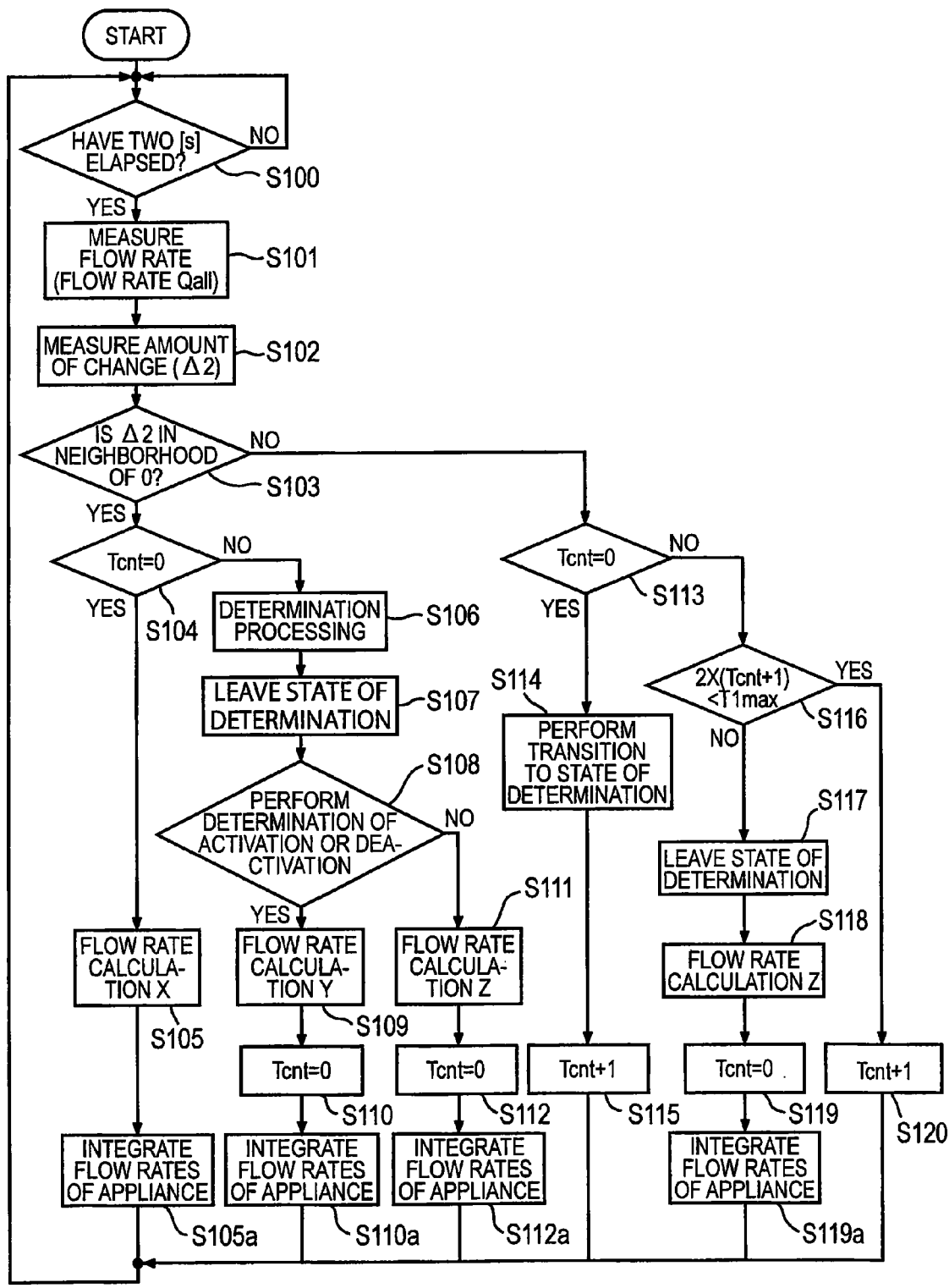
FIG. 6 is a flowchart showing operation of the flow rate measuring apparatus of the first embodiment of the present invention.

Determination of use of the gas appliance 11 performed by the appliance determination unit 3 will now be described by reference to FIGS. 4 and 5.

First, the flow rate measurement unit 1 measures the flow rate of gas flowing through the measurement passage 30 at intervals of two seconds. FIG. 4 is a view plotting time variations in the flow rate measured by the flow rate measurement unit 1 of the present embodiment. The drawing shows that the gas cooker is used from time t2; that the fan heater is used at time t5; that the quantity of gas flow in the fan heater is controlled from time t9 to time t16; and that the gas cooker is deactivated at time t19.

Based on a difference (an amount of change: Δ2) between the quantity of gas flow currently measured by the flow rate measurement unit 1 and the quantity of gas flow measured two seconds before, which is computed by the computing unit 15, and the amount of increase (decrease) in the flow rate acquired from when the amount of change changes from zero until when the amount of change again comes to zero, the appliance determination unit 3 determines a gas appliance having started operation. FIG. 5 shows time variations in the amount of change.

To be more specific, there is analyzed the amount of change achieved from when a state of determination is achieved as a result of the amount of change coming to a value other than zero (at time t2) until when the amount of change again comes to zero (at time t3). Further, the maximum amount of change, the flow rate (Qa) changed from time t2 to t3, and the rough estimated flow rate shown in FIG. 2 are compared to each other, thereby determining the employed gas appliance 11.

The appliance determination unit 3 is set so as to recognize use of the gas cooker when Δ2 exhibits a characteristic of a change from a neighborhood of 0 [L/hour]→a neighborhood of 100 [L/hour]→a neighborhood of 0 [L/hour]. Moreover, the appliance determination unit 3 is set so as to recognize use of the fan heater when Δ2 exhibits a characteristic of a change from a neighborhood of 0 [L/hour]→a neighborhood of 60 [L/hour]→a neighborhood of 60 [L/hour]→a neighborhood of 0 [L/hour]. Characteristics of Δ2 specifically designed for respective gas appliances 11 are previously installed in the other appliances. The word "neighborhood" refers to; for instance, a range where an error falls within a value of 10%.

Previous installation, in the appliance determination unit 3, of characteristics designed for the respective gas appliances with regard to a difference between the quantity of gas flow achieved at a reference time and the quantity of gas flow achieved an arbitrary time before and determination of an operating appliance are not directly relevant to the present invention; hence, any further explanations thereof are omitted here. Moreover, the appliance determination unit 3 also determines that the gas appliance 11 already determined as activated has been activated at time t2 with the flow rate Qa, and leaves the state of determination.

In relation to the time interval at which the amount of change is determined, the appliance determination unit 3 does not need to be limited to two seconds and may also be set to four seconds before, six seconds before, ..., (a time interval at which the flow rate is measured)×(an arbitrary integer) before. For reasons of the value of a time interval at which the amount of change is determined and a time consumed before the amount of change itself again returns to zero, several seconds are consumed before the appliance determination unit 3 enters the state of determination, to thus perform determination of an appliance. Therefore, a time (called T1) required to determine activation changes from one gas appliance 11 to another.

A method for calculating the gas usage flow rate for each appliance, which is performed by the appliance flow rate calculation unit 16 when the user has used the gas appliance 11, is now described. FIGS. 6 through 10 are flowcharts showing operation of the flow rate measuring apparatus 10 of the present embodiment.

Explanations are based on the following assumptions. First, activation and deactivation of the gas appliance 11 are assumed not to be performed simultaneously. Second, the appliance determination unit 3 is assumed to accurately determine activation and deactivation of an appliance without fail by analyzing the flow rate measured by the flow rate measurement unit 1. All changes in the flow rate that do not meet the assumptions are determined to correspond to control of an appliance in operation.

Determination of deactivation is handled as follows. When an absolute value of a difference between a decreased flow rate Qa and the usage flow rate being currently used by the gas appliance 11 falls within a range of; for instance, 5 [L/hour], the appliance determination unit 3 determines that the gas appliance 11 has deactivated.

Operation of the appliance flow rate calculation unit 16 will be described hereunder.

At time t1 (when there is no operating appliance), the flow rate measurement unit 1 measures the flow rate Qall (S101); computes the amount of change (Δ2) (S102); analyzes a value of the change (S103); and recognizes a value of a variable Tcnt because Δ2 assumes a value of 0 (S104).

The variable Tcnt is the number of times the flow rate measurement unit 1 measured the flow rate from when the appliance determination unit enters the state of determination of an appliance until the unit leads the state (measurement performed at the time of entrance is also counted). An initial value is assumed to be zero, and an initial value is assumed to be obtained at time t1. Since the variable Tcnt assumes a value of zero, processing of flow rate calculation X is performed (S105); the appliance flow rate integration unit 18 integrates the usage flow rate used by the operating gas appliance 11 determined in S105 (S105a); and a wait state continues until the next two seconds (a time to measure the flow rate) come (S100).

Figure 7:
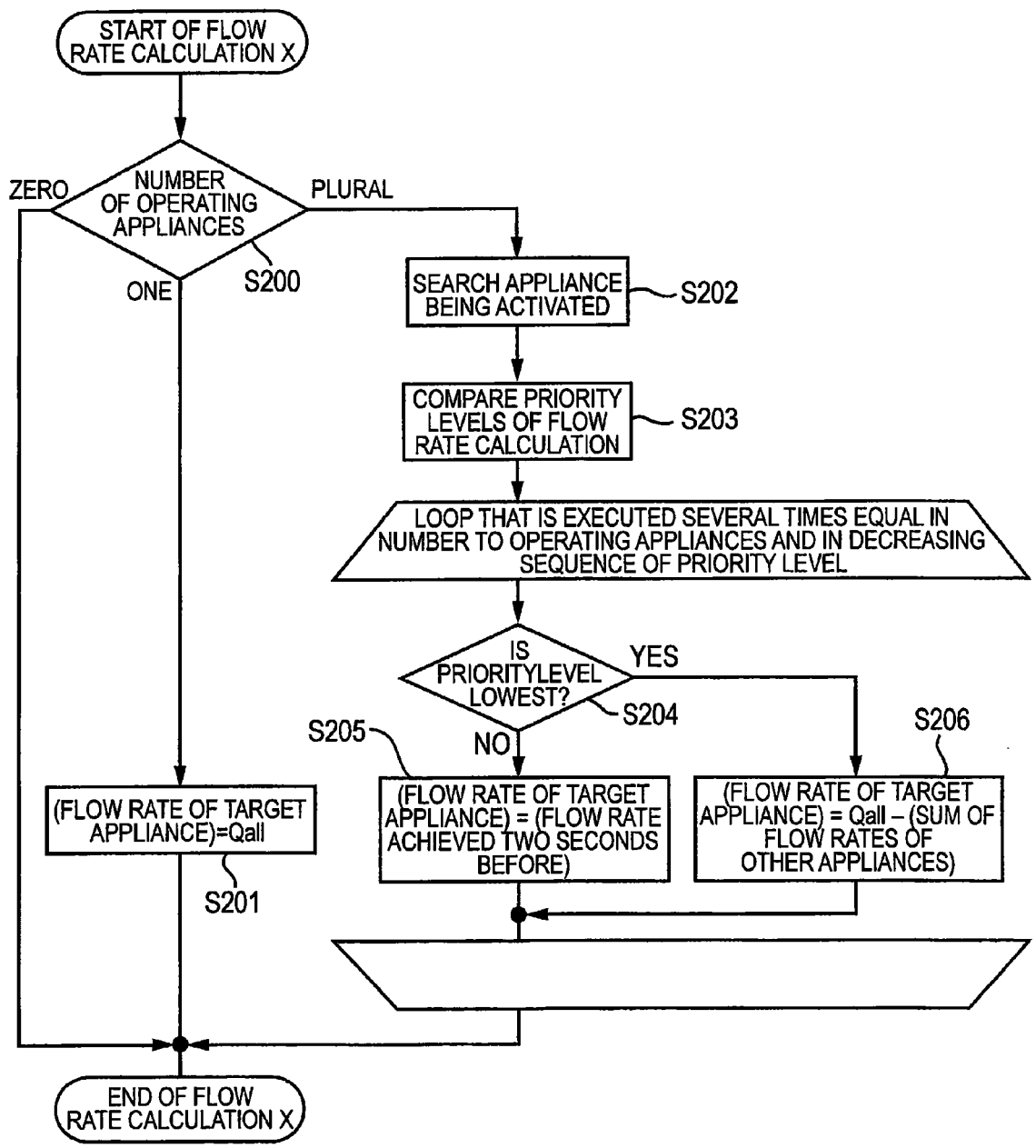
FIG. 7 is a flowchart showing operation of the flow rate measuring apparatus of the first embodiment of the present invention.

Flow rate calculation X corresponds to the flowchart shown in FIG. 7, and there is no currently-operating gas appliance (S200); hence, calculation ends without performance of processing. Even in relation to the integration of the usage flow rate pertaining to S105a, integration is not performed because there is no operating gas appliance.

At time t2 (initiation of operation of the gas cooker), the flow rate measurement unit 1 measures the flow rate Qall (S101); computes the amount of change (Δ2) (S102); analyzes a value of the change (S103); and recognizes a value of the variable Tcnt because Δ2 is not zero (S113).

Since the variable Tcnt assumes a value of 0, there is effected transition to the state of determination (S114), where the variable Tcnt is counted up (S115), and a wait state continues until the next two seconds (a time to measure the flow rate) come (S100).

At time t3 (the gas cooker is in operation), the flow rate measurement unit 1 measures the flow rate Qall (S101); computes the amount of change (Δ2) (S102); analyzes a value of the change (S103); and recognizes a value of a variable Tcnt because Δ2 assumes a value of 0 (S104).

Since Tcnt assumes a value of 1, determination processing is performed (S106). From a time variation in Δ2 and the amount of change (Qa) between the flow rate Qall measured by the flow rate measurement section 1 immediately before occurrence of transition to the state of determination and the flow rate measured immediately after occurrence of transition (=the present time), the appliance determination unit 3 determines that the gas cooker is started to be used (the number of gas appliances in operation is set to one). Processing leaves the state of determination (S107). Since activation is determined (S108), flow rate computation Y is performed (S109); the count value of Tcnt is cleared so as to enable performance of the next determination (S110). The appliance flow rate integration unit 18 integrates usage flow rate used by the gas appliance in operation determined in S109 (S110a), and a wait is held until the next two seconds (a time to measure the flow rate) come (S100).

Figure 8:
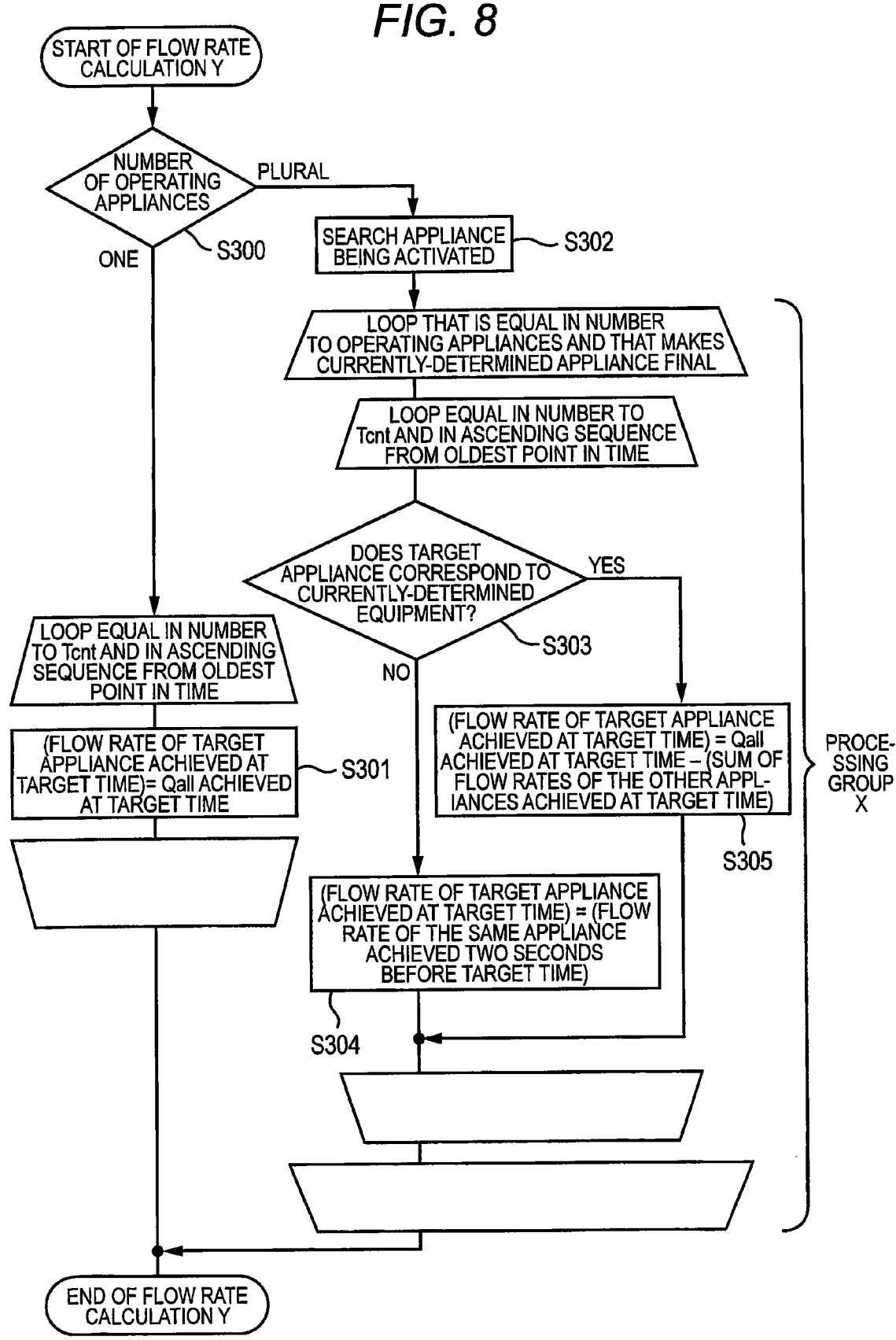
FIG. 8 is a flowchart showing operation of the flow rate measuring apparatus of the first embodiment of the present invention.

Flow rate calculation Y corresponds to a flowchart shown in FIG. 8, and the number of currently-operating gas appliances is recognized (S300). Since the number of currently-operating gas appliances is one, a loop executes Tcnt+1 times, and the flow rate in each appliance is calculated in connection with a target appliance (only the gas cooker in the embodiment) at a target time in increasing order of time from the oldest point in time (in order of t2 and t3 in the embodiment) (S301). Since the number of appliances operating at this time is only one, a value Qall measured by the flow rate measurement unit 1 at t2 is taken as the flow rate in the target appliance (the gas cooker) at t2, and a value Qall measured by the flow rate measurement unit 1 at t3 is taken as the flow rate in the target appliance at t3.

The flow rate measurement unit 1 measures the flow rate Qall at time t4 (the gas cooker is still in operation) (S101); calculates the amount of change (Δ2) (S102); analyzes a value of the change (S103); and recognizes the variable Tcnt because Δ2 assumes a value of 0 (S104). Since Tcnt assumes a value of 0, flow rate calculation processing X is performed (S105). The appliance flow rate integration unit 18 integrates usage flow rate used by the operating gas appliance calculated in S105 (S105a), and a wait is held until the next two seconds (a time to measure the flow rate) come (S100).

Flow rate calculation X corresponds to a flowchart shown in FIG. 7, and the number of currently-operating gas appliances is recognized (S200). Since the number of currently-operating gas appliances is one, the value Qall measured by the flow rate measurement unit 1 at t4 is taken as the flow rate in the target appliance (the gas cooker) achieved at t4.

The flow rate measurement unit 1 measures the flow rate Qall at time t5 (the gas cooker still remains in operation, and the fan heater starts operation) (S101); calculates the amount of change (Δ2) (S102); analyzes a value of the change (S103); and recognizes the value of the variable Tcnt because Δ2 does not assume a value of 0 (S113).

Since Tcnt assumes a value of 0, there is effected transition to the state of determination (S114), where Tcnt is counted up (S115). A wait is held until the next two seconds (a time to measure the flow rate) come (S100).

The flow rate measurement unit 1 measures the flow rate Qall at time t6 (both the gas cooker and the fan heater are in operation) (S101); calculates the amount of change (Δ2) (S102); analyzes a value of the change (S103); and recognizes the variable Tcnt because Δ2 does not assume a value of 0 (S113).

Since Tcnt assumes a value of 1, the Tcnt is further compared with T1max (S116). The term T1max means the longest time among times (T1) that are required for the appliance determination unit 3 to determine an appliance and that change from one gas appliance 11 to another. In the present embodiment, T1 for the gas cooker is 4 [s], and T1 for the fan heater is 6 [s]. Hence, T1max is taken as 6 [s]. The followings are derived from this. If the appliance determination unit 3 cannot have determined the start or stop of operation of the gas appliance 11 even after elapse of T1max since occurrence of transition to the state of appliance determination, changes occurred in the quantity of gas flow in that period show that the currently-operating appliance has undergone flow rate control.

Since the maximum time required to determine the start or stop of operation at S116 has not elapsed at this point in time, the changes in the flow rate cannot be determined to be flow rate control for the operating appliance. Therefore, Tcnt is further counted up (S120), and a wait is held until the next two seconds (a time to measure the flow rate) come (S100).

The flow rate measurement unit 1 measures the flow rate Qall at time t7 (both the gas cooker and the fan heater are in operation) (S101); calculates the amount of change (Δ2) (S102); analyzes a value of the change (S103); and recognizes the variable Tcnt because Δ2 assumes a value of 0 (S104).

Since Tcnt assumes a value of 2, determination processing is performed (S106). From a time variation in Δ2 and the amount of change (Qa) between the flow rate Qall measured by the flow rate measurement section 1 immediately before occurrence of transition to the state of determination and the flow rate measured immediately after occurrence of transition (=the present time), the appliance determination unit 3 determines that the fan heater has started operation (the number of gas appliances in operation is set to two). Processing leaves the state of determination (S107). Since operation is determined to be started (S108), flow rate computation Y is performed (S109); the count value of Tcnt is cleared so as to enable performance of the next determination (S110). The appliance flow rate integration unit 18 integrates usage flow rate used by the gas appliance in operation calculated in S109 (S110a), and a wait is held until the next two seconds (a time to measure the flow rate) come (S100).

Flow rate calculation Y corresponds to a flowchart shown in FIG. 8, and the number of currently-operating gas appliances is recognized (S300). Since the number of currently-operating gas appliances is two, an inquiry about an operating appliance is sent to the appliance determination unit 3, thereby recognizing the fact that one gas cooker and one fan heater are now operating and that the appliance having just now finished undergoing determination is the fan heater of the two appliances (S302). Flow rates in the target appliances (the gas cooker and the fan heater) respectively achieved at a target time are calculated through a double loop (the Tcnt+1 loop and loops equal in number to the operating appliances) (S304, S305).

The Tcnt+1 loop is taken as a loop for computing the flow rate in an increasing order of time from the oldest point in time (in order of t5, t6, and t7 in the embodiment), and the loops equal in number to appliances are arranged such that the appliance just now determined to have started operation (the fan heater) comes to the last.

The reason why a flow rate of the gas cooker that has already operated is sequentially calculated and why a flow rate achieved 2 [s] before is always succeeded (an approximate equation that does not cause any change in flow rate) is that priority is given to determination of activation/deactivation of the gas appliance. Since the usage flow rate is calculated over a long period of time; for instance, one month, the time required to determined start or stop of operation is considered to be an extremely short period as compared with one month and have no substantial influence on accuracy. When an attempt is made to calculate the usage flow rate by a waveform pattern as in the related-art example, operation patterns of all combinations must be provided for all of the gas appliances, which is not realistic.

The flow rate measurement unit 1 measures the flow rate Qall at time t8 (both the gas cooker and the fan heater are in operation) (S101); calculates the amount of change ($\Delta 2$) (S102); analyzes a value of the change (S103); and recognizes the variable Tcnt because $\Delta 2$ assumes a value of 0 (S104). Since the variable Tcnt assumes a value of zero, processing of flow rate calculation X is performed (S105); the appliance flow rate integration unit 18 integrates the usage flow rate used by the operating gas appliance calculated in S105 (S105a); and a wait state continues until the next two seconds (a time to measure the flow rate) come (S100).

Flow rate calculation X corresponds to a flowchart shown in FIG. 7, and the number of currently-operating gas appliances is recognized (S200). Since the number of currently-operating gas appliances is two, an inquiry about an operating appliance is sent to the appliance determination unit 3, thereby recognizing the fact that one gas cooker and one fan heater are now operating (S202). Further, a check is made as to which one of the gas appliances 11 is first subjected to flow rate calculation, by reference to the flow rate calculation priority storage unit 17 (S203). There is effected a comparison among the priority levels imparted to the gas appliances through loops equal in number to the operating appliances (S204), thereby calculating flow rates in the target appliances (the gas cooker and the fan heater) respectively achieved at time t8 (S205, S206).

The reason why the flow rate is calculated in order of a descending priority level from the flow rate with the top priority level is because difficulty is encountered in distributing the amount of change to the two appliances from $\Delta 2$ by accurate control operation when the two gas appliances are simultaneously controlled. Therefore, reflecting $\Delta 2$ on the gas appliance that is controlled in preference at high frequency yields a high probability of an appliance-specific flow rate being accurate. For this reason, the usage flow rate can be calculated with high accuracy.

The flow rate measurement unit 1 measures the flow rate Qall at time t9 (both the gas cooker and the fan heater are in operation, and control of the fan heater is started) (S101); calculates the amount of change ($\Delta 2$) (S102); analyzes a value of the change (S103); and recognizes the variable Tcnt because $\Delta 2$ does not assume a value of 0 (S113).

Since the variable Tcnt assumes a value of 0, there is effected transition to the state of determination (S114), where the variable Tcnt is counted up (S115), and a wait state continues until the next two seconds (a time to measure the flow rate) come (S100).

At time t10 (both the gas cooker and the fan heater are in operation, and the fan heater is also being controlled), the flow rate measurement unit 1 measures the flow rate Qall (S101); computes the amount of change ($\Delta 2$) (S102); analyzes a value of the change (S103); and recognizes a value of a variable Tcnt because $\Delta 2$ does not assume a value of 0 (S113).

Since Tcnt assumes a value of 1, the Tcnt is further compared with T1max (S116). Since the maximum time required to determine the start or stop of operation at S116 has not elapsed at this point in time, the changes in the flow rate cannot be determined to be flow rate control for the operating appliance. Therefore, Tcnt is further counted up (S120), and a wait is held until the next two seconds (a time to measure the flow rate) come (S100).

At time t11 (both the gas cooker and the fan heater are in operation, and the fan heater is being controlled), the flow rate measurement unit 1 measures the flow rate Qall (S101); computes the amount of change ($\Delta 2$) (S102); analyzes a value of the change (S103); and recognizes a value of a variable Tcnt because $\Delta 2$ does not assume a value of 0 (S113).

Since Tcnt assumes a value of 2, the Tcnt is further compared with T1max (S116). Since the maximum time required to determine the start or stop of operation at S116 has elapsed at this point in time, the changes in the flow rate cannot be determined to be flow rate control for the operating appliance. For these reasons, processing of flow rate calculation Z is performed (S118); the count value of Tcnt is cleared so as to enable performance of the next determination (S119); the appliance flow rate integration unit 18 integrates the usage flow rate used by the operating gas appliance calculated in S118 (S119a); and a wait state continues until the next two seconds (a time to measure the flow rate) come (S100).

Figure 9:
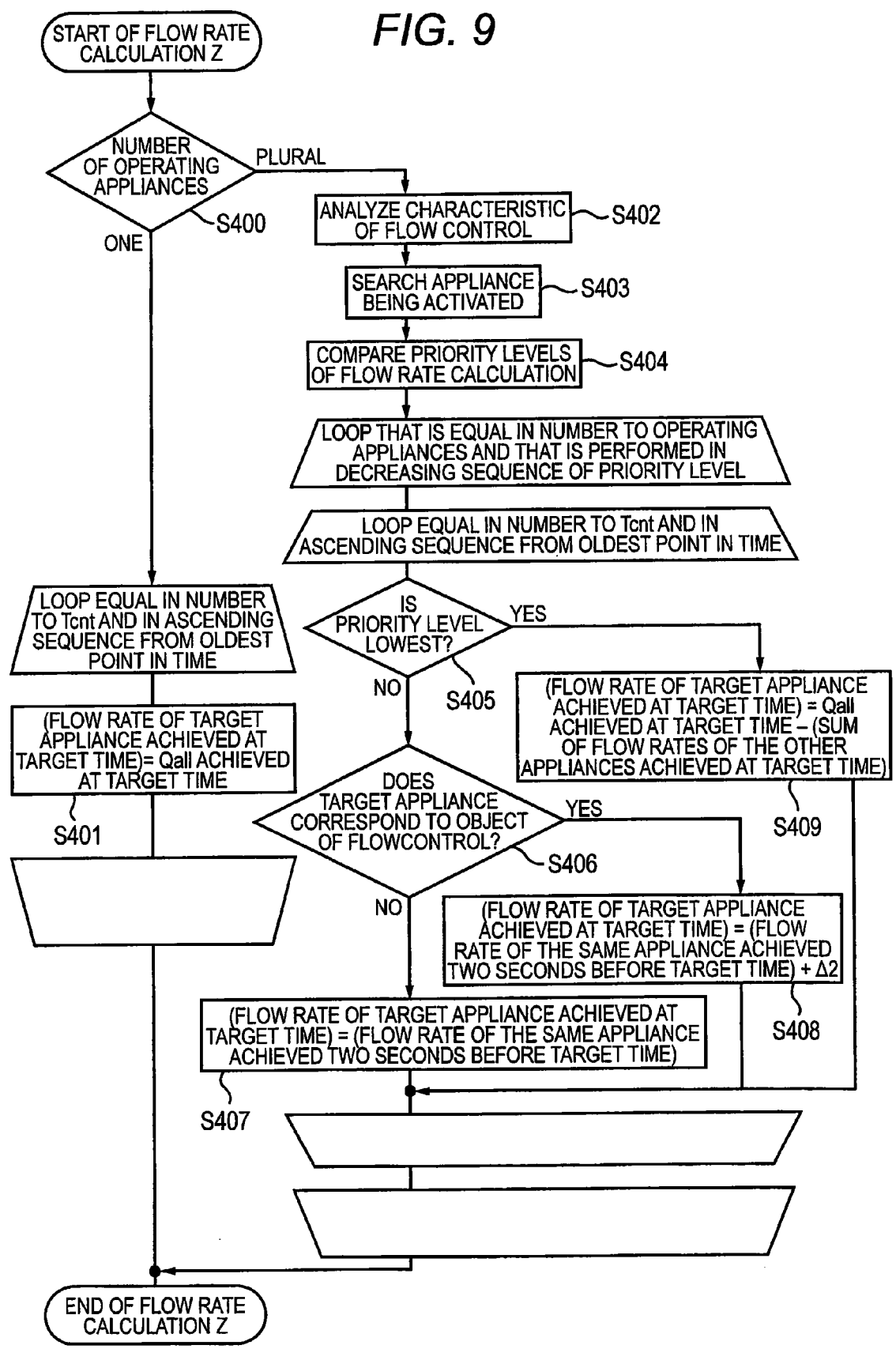
FIG. 9 is a flowchart showing operation of the flow rate measuring apparatus of the first embodiment of the present invention.

Flow rate calculation Z corresponds to the flowchart shown in FIG. 9, and the number of currently-operating gas appliances is recognized (S400). Since the number of currently-operating gas appliances is two, a characteristic of $\Delta 2$ achieved since transition was made to the state of determination is analyzed, thereby analyzing an appliance to which the flow rate change belongs (S402). An inquiry about an operating appliance is sent to the appliance determination unit 3, thereby recognizing the fact that one gas cooker and one fan heater are now operating (S403). Further, a check is made as to which one of the gas appliances 11 is first subjected to flow rate calculation, by reference to the flow rate calculation priority storage unit 17 (S404).

Through the double loop (the Tcnt+1 loop and loops equal in number to the operating appliances), the priority levels imparted to the respective gas appliances are compared with each other (S405), and a result of analysis pertaining to S402 is reflected on a result of comparison (S406), thereby calculating the appliance-specific flow rates in the target appliances (the gas cooker and the fan heater) achieved at a target time (S407, S408, and S409).

The Tcnt+1 loop is taken as a loop for computing the flow rate in ascending order of time from the oldest point in time (in order of t9, t10, and t11 in the embodiment), and the loops equal in number to appliances are taken as loops for computing the flow rate in an increasing order of priority level.

For instance, in relation to a method for determining an appliance whose flow control corresponds to the change from the characteristic of Δ2 in S402, when a state in which ↑Δ2| falls within a range of 10 [L/hour] is continual for more than a period of T1max, the change is determined to be flow control of a fan heater. Thus, the method is assumed to be previously determined for each gas appliance and set in the appliance flow rate calculation unit.

Processing pertaining to t12 to t14 is identical with processing pertaining to t9 to t11, and hence its explanation is omitted.

At time 15 (both the gas cooker and the fan heater are in operation, and the fan heater is being controlled), the flow rate measurement unit 1 measures the flow rate Qall (S101); computes the amount of change (Δ2) (S102); analyzes a value of the change (S103); and recognizes a value of a variable Tcnt because Δ2 does not assume a value of 0 (S113).

Since the variable Tcnt assumes a value of 0, there is effected transition to the state of determination (S114), where the variable Tcnt is counted up (S115), and a wait state continues until the next two seconds (a time to measure the flow rate) come (S100).

At time t16 (both the gas cooker and the fan heater are in operation, and the fan heater is being controlled), the flow rate measurement unit 1 measures the flow rate Qall (S101); computes the amount of change (Δ2) (S102); analyzes a value of the change (S103); and recognizes a value of a variable Tcnt because Δ2 does not assume a value of 0 (S113).

Since Tcnt assumes a value of 1, the Tcnt is further compared with T1max (S116). Since the maximum time required to determine the start or stop of operation at S116 has not elapsed at this point in time, the changes in the flow rate cannot be determined to be flow rate control for the operating appliance. Therefore, Tcnt is further counted up (S120), and a wait is held until the next two seconds (a time to measure the flow rate) come (S100).

At time t17 (both the gas cooker and the fan heater are operating, and the fan heater has finished being controlled), the flow rate measurement unit 1 measures the flow rate Qall (S101); computes the amount of change (Δ2) (S102); analyzes a value of the change (S103); and recognizes a value of a variable Tcnt because Δ2 assumes a value of 0 (S104).

Since Tcnt assumes a value of 2, determination processing is performed (S106). However, in this case, the change is not a previously-registered time variation in Δ2, and hence the appliance determination unit 3 does not determine the change as start of operation of the appliance. Further, the change in the flow rate achieved in that period also differs from the flow rate in a currently-operating appliance, and hence the change is not determined to be deactivation, as well. Since the change in the flow rate achieved thus far is determined to be attributable to flow rate control, processing leaves the state of determination (S107).

Next, since activation or deactivation is not determined (S108), processing of flow rate calculation Z is performed (S111); the count value of Tcnt is cleared so as to enable performance of the next determination (S112); and the appliance flow rate integration unit 18 integrates the usage flow rate used by the operating gas appliance calculated in S111 (S112a), and a wait state continues until the next two seconds (a time to measure the flow rate) come (S100). Since processing pertaining to a time t18 is identical with that pertaining to the time t8, its explanation is omitted.

At time t19 (the fan heater is in operation, but the gas cooker remains deactivated), the flow rate measurement unit 1 measures the flow rate Qall (S101); computes the amount of change (Δ2) (S102); analyzes a value of the change (S103); and recognizes a value of a variable Tcnt because Δ2 does not assume a value of 0 (S113).

Since Tcnt assumes a value of 0, there is effected transition to the state of determination (S114), where the Tcnt is counted up (S115), and a wait state continues until the next two seconds (a time to measure the flow rate) come (S100).

At time t19 (the fan heater is in operation), the flow rate measurement unit 1 measures the flow rate Qall (S101); computes the amount of change (Δ2) (S102); analyzes a value of the change (S103); and recognizes a value of a variable Tcnt because Δ2 assumes a value of 0 (S104).

Since Tcnt assumes a value of 1, determination processing is performed (S106). From a time variation in Δ2 and the amount of change (Qa) between the flow rate Qall measured by the flow rate measurement section 1 immediately before occurrence of transition to the state of determination and the flow rate measured immediately after occurrence of transition (=the present time), the appliance determination unit 3 determines that the gas cooker has deactivated (the number of operating appliances is set to one). Deactivation is assumed to have arisen; for instance, when Δ2 assumes a negative sign and when a difference between the flow rate Qa and the flow rate in the operating appliance achieved 2 [s] before falls within a range of 10%.

Processing leaves the state of determination (S107). Since operation is determined to be deactivated (S108), flow rate computation Y is performed (S109); the count value of Tcnt is cleared so as to enable performance of the next determination (S110). The appliance flow rate integration unit 18 integrates usage flow rate used by the gas appliance in operation calculated in S109 (S110a), and a wait is held until the next two seconds (a time to measure the flow rate) come (S100).

Although time t20 is different from time t3 in terms of an operating gas appliance 11, time t20 and t3 are identical with each other in terms of processing, and hence explanations of processing are omitted.

At time t21 (the fan heater is in operation, and control of the fan heaters is started), the flow rate measurement unit 1 measures the flow rate Qall (S101); computes the amount of change (Δ2) (S102); analyzes a value of the change (S103); and recognizes a value of a variable Tcnt because Δ2 does not assume a value of 0 (S113).

Since Tcnt assumes a value of 0, there is effected transition to the state of determination (S114), where the Tcnt is counted up (S115), and a wait state continues until the next two seconds (a time to measure the flow rate) come (S100).

At time t22 (the fan heater is in operation, and control of the fan heater ends), the flow rate measurement unit 1 measures the flow rate Qall (S101); computes the amount of change (Δ2) (S102); analyzes a value of the change (S103); and recognizes a value of a variable Tcnt because Δ2 assumes a value of 0 (S104).

Since Tcnt assumes a value of 1, determination processing is performed (S106). From a time variation in Δ2 and the amount of change (Qa) between the flow rate Qall measured by the flow rate measurement section 1 immediately before occurrence of transition to the state of determination and the flow rate measured immediately after occurrence of transition (=the present time), the appliance determination unit 3 makes the following determination. Specifically, the fan heater has not deactivated because Qa differs from the current flow rate in the fan heater, and control is determined to have been performed. Since activation or deactivation has not been determined (S108), processing of flow rate calculation Z is performed (S111). The count value of Tcnt is cleared such that next determination can be performed (S112), and the appliance flow rate integration unit 118 integrates the usage flow rate used by the operating gas appliance calculated in S111 (S112a). A wait state continues until the next two seconds (a time to measure the flow rate) come (S100).

As mentioned above, the flow rate is calculated with superior accuracy for each gas appliance by specifics of determination of the appliance determination unit 3, and hence the calculation method is changed. A determination in S103 that Δ2 is in a neighborhood of 0 is made in such a way that Δ2 is determined to be in a neighborhood of 0 when |Δ2| is 2 [L/hour] or less. When the number of operating gas appliances 11 is one, a value measured by the flow rate measurement unit 1 is unconditionally taken as the flow rate in the operating as appliance 11. The reason for this is that an appliance-specific usage flow rate can be calculated in a shorter period of time and with higher accuracy as compared with a case where an appliance-specific usage flow rate is calculated by flow rate patterns.

Second Embodiment

Figure 10:
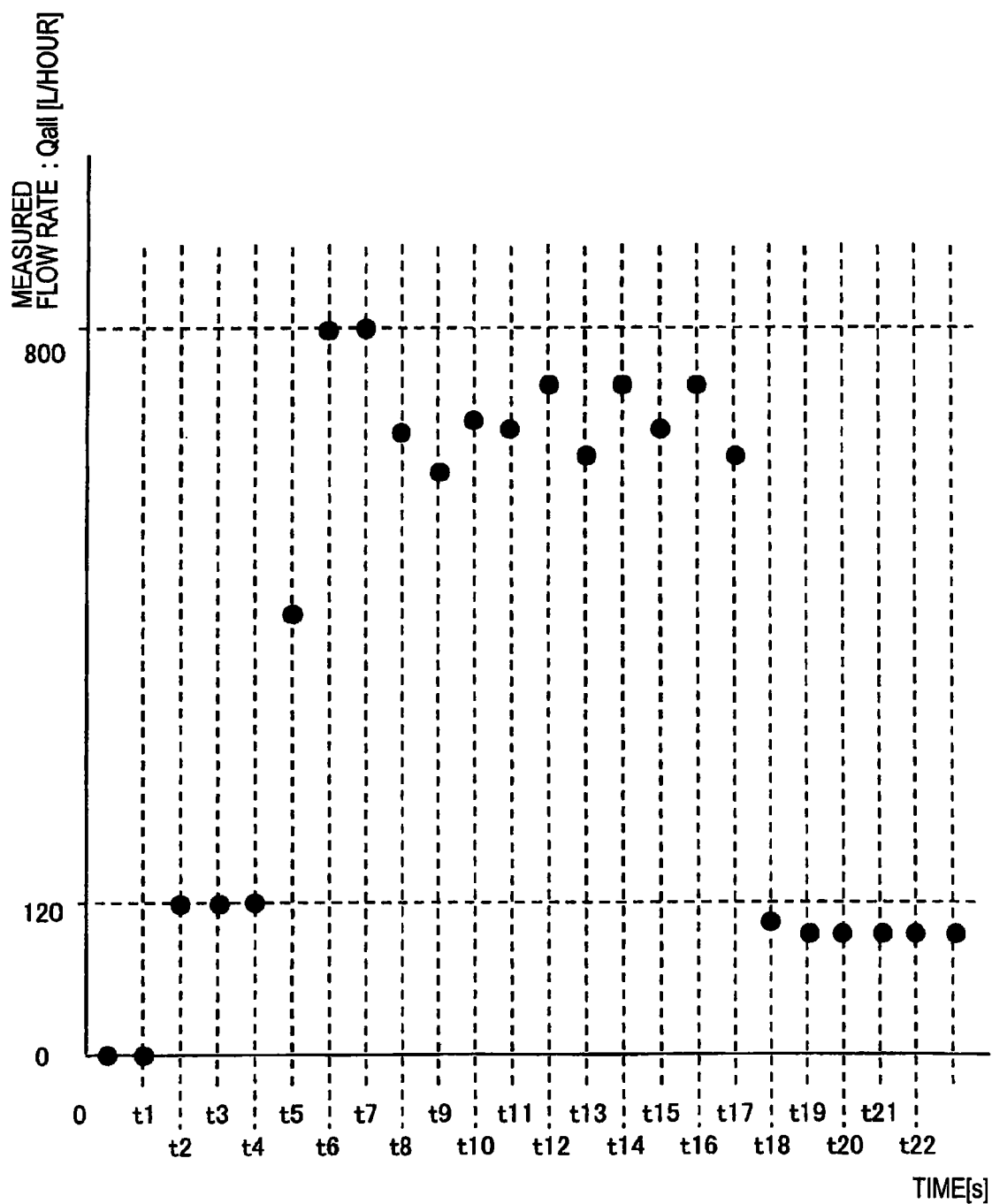
FIG. 10 is a plot of a flow rate measured by the flow rate measurement unit of the first embodiment of the present invention.

FIG. 10 is a view plotting time variations in the flow rate measured by the flow rate measurement unit 1 of a second embodiment of the present invention. A block diagram of the flow rate measuring apparatus is the same as that described in connection with the first embodiment.

FIG. 10 shows that a hot water supply started operation at time t4 while the fan heater is in operation and deactivated at t18. The hot water supply usually uses a greater quantity of gas flow than does the fan heater and consumes a large flow rate; hence, a value that is varied by control is also large. For these reasons, when the hot water supply has temporarily started operation, control of the other operating gas appliances 11 is concealed by a waveform of a value measured by the flow rate measurement unit 1, so that neither a time at which control is performed nor the amount of change in control can be specified. Moreover, no regularity exists in the amount of change in control.

Therefore, in the appliance flow rate calculation priority storage unit 17 shown in FIG. 2, the priority level of the hot water supply is set to a low level, and the flow rate in the appliances achieved in the middle of operation of the hot water supply basically approximates to a constant value. The reason for this is based on the idea that, if control of the flow rate in the hot water supply is determined to be control of another gas appliance, an error in the usage flow rate used by the other gas appliance will become great and that, if control of the flow rate in a gas appliance other than the hot water supply, is taken as control of the flow rate in the hot water supply, an error will be small.

However, when a difference exists between the flow rate Qall measured by the flow rate measurement unit 1 before the period of operation of the hot water supply (t4) and the flow rate Qall measured by the same after the period of operation (t17), it is obvious that another operating gas appliance underwent flow rate control in the middle of operation of the hot water supply. Hence, the flow rate in the other gas appliance (the fan heater in this case) in operation is calculated. The flow rate in the hot water supply achieved during this period corresponds to the flow rate for the appliance determined to be deactivated and hence is calculated by subtracting the sum of quantities of used flow by the other gas appliances from the value Qall measured by the flow rate measurement unit 1.

Figure 11:
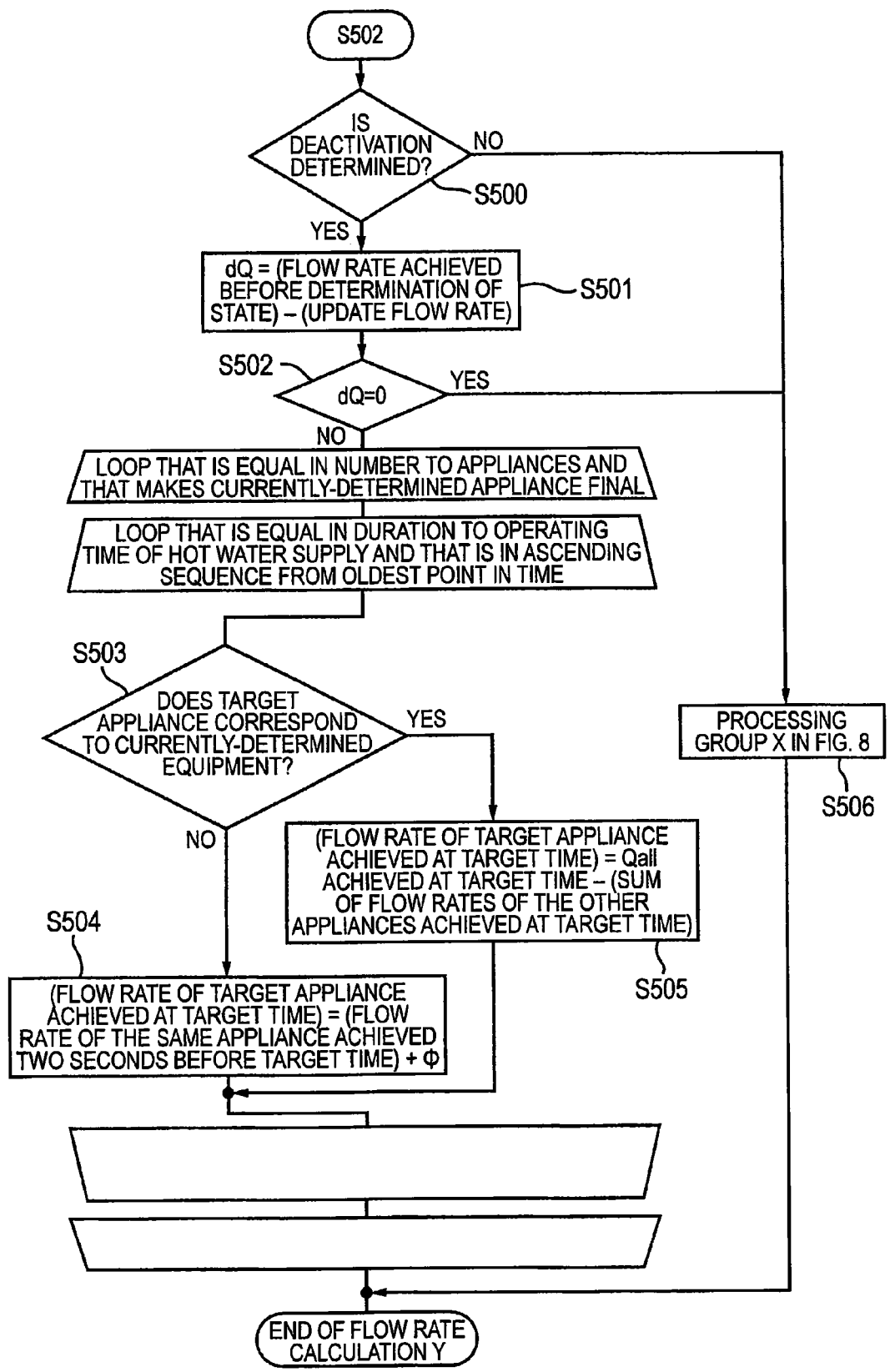
FIG. 11 is a flowchart showing operation of the flow rate measuring apparatus of a second embodiment of the present invention.

FIG. 11 is a flowchart showing operation of the appliance flow rate calculation unit 16 of the embodiment, which is a replacement of processing (processing group X) subsequent to S302 of processing operations pertaining to flow rate calculation Y of the first embodiment.

When the hot water supply is deactivated at time t17 (S500), a dQ (a difference between a value measured by the flow rate measurement unit 1 before operation of the hot water supply and a value measured by the same after operation of the hot water supply) is computed (S501). When dQ does not assume a value of 0 (S502), the flow rate in the fan heater is calculated by adding φ to the flow rate achieved two seconds before a target time, by the double loop (a loop equivalent to the period of operation of the hot water supply and loops equal in number to operating appliances) (S504), and the flow rate in the hot water supply is calculated by subtracting the sum of flows used by the other gas appliances from the value Qall measured by the flow rate measurement unit 1, by the double loop (S505). Reference symbol φ designates a value calculated by subtracting dQ by a period of operation of the hot water supply.

When the hot water supply is not determined to be deactivated in S500, processing of the processing group X is performed as in the first embodiment.

As mentioned above, even when waveforms for the flow rates Qall achieved in all patterns in which the gas appliances operated are not available, the usage flow rate can be computed with high accuracy by making a change to the method for calculating the usage flow rate used by an operating gas appliance, based on the result of determination made by the appliance determination unit 3. The gas appliances being used are determined based on the flow rates measured by the ultrasonic flow meter, whereby appliance-specific flow rates of respective gas appliances can be calculated, and customer service, such as an appliance-specific fee, can be implemented.

The above-described units may also be implemented in the form of a program that causes cooperative operation of hardware resources having a CPU (or a microcomputer), RAM, ROM, a storage/recorder I/O, and the like, such as electric/information equipment, a computer, and a server. So long as the units are in the form of a program, the distribution or update of new functions and operation for installing the program can be readily performed by recording the program on a recording medium, such as a magnetic medium and an optical medium, or distributing the program by use of a communication line, such as the Internet.

Third Embodiment

Figure 12:
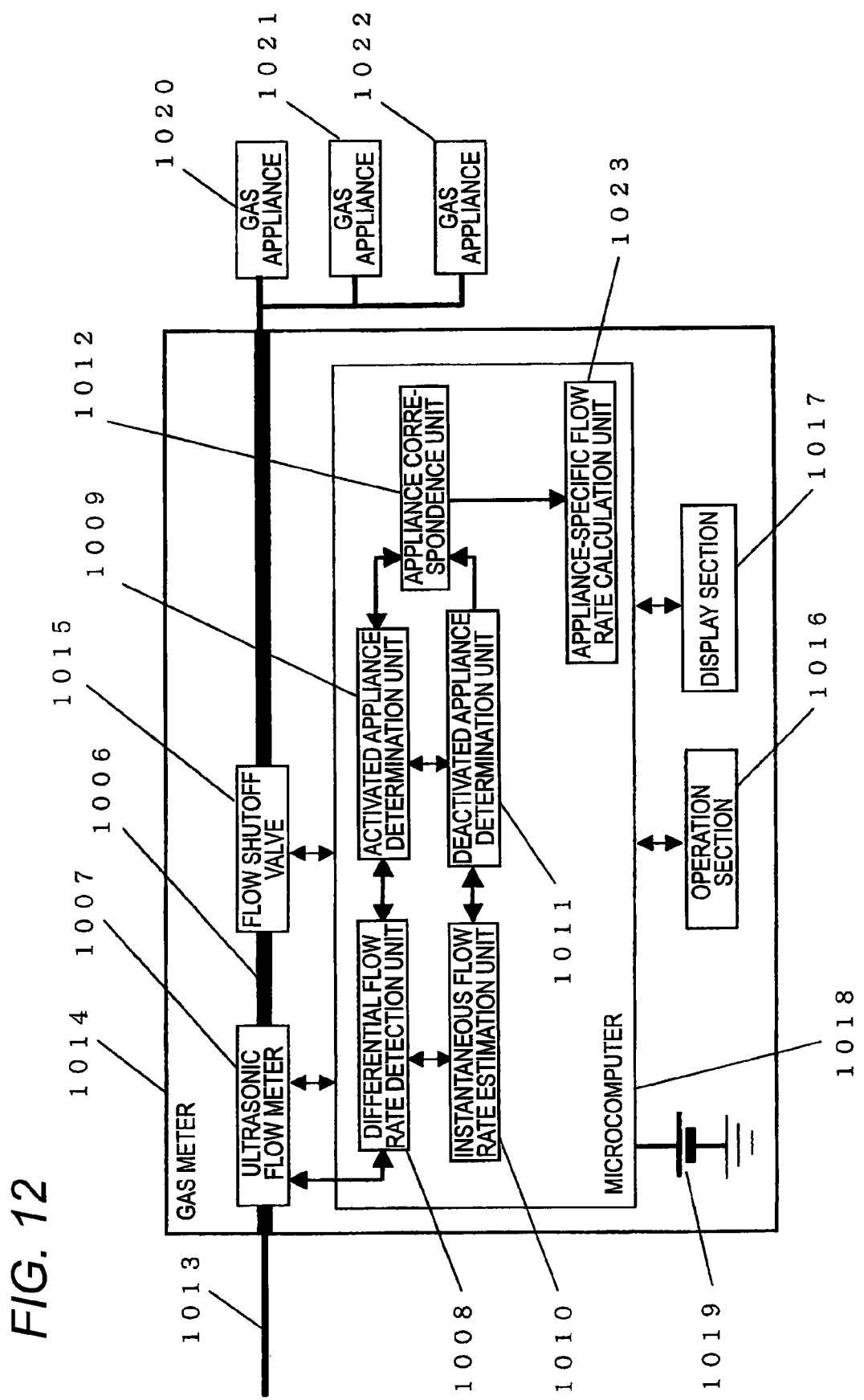
FIG. 12 is a block diagram of a flow rate measuring apparatus of a third embodiment of the present invention.

FIG. 12 shows a block diagram of a gas meter serving as a flow rate measuring apparatus of a third embodiment of the present invention.

In FIG. 12, the gas meter has an ultrasonic flow meter 1007 serving as a flow rate measurement unit that measures the flow rate in a passage 1006; a differential flow rate detection unit 1008 that calculates a differential flow rate from flow rates measured by the ultrasonic flow meter 1007 at predetermined time intervals; an activated appliance determination unit 1009 that determines a gas appliance (appliance) activated by being connected to the passage 1006; an instantaneous flow rate estimation unit 1010 that calculates an instantaneous flow rate of an activated appliance by use of the differential flow rate; and a deactivated appliance determination unit 1011 that determines a deactivated appliance based on the instantaneous flow rate calculated by the instantaneous flow rate estimation unit 1010.

Reference numeral 1012 designates an appliance correspondence unit that defines a correspondence between an activated appliance and a deactivated appliance; 1013 designates a gas passage; 1014 designates a gas meter serving as a flow rate measuring apparatus; 1015 designates a passage shutoff valve that shuts off the passage 1006 when gas is desired to be deactivated; 1016 designates an operation section; 1017 designates a display section that displays a flow rate; 1018 designates a microcomputer that controls operations and performs arithmetic operations; 1019 designates a battery; 1020 to 1022 designate gas appliances connected to the gas passage 1013; and 1023 designates appliance-specific flow rate calculation unit that calculates the usage flow rate used by each of the gas appliances associated by the appliance correspondence unit 1012.

Operation and working-effects of the above-configured gas meter will be described hereunder by reference to FIGS. 12 through 16.

First, in relation to basic operations, an appliance of some kind is determined to have started operation when a differential flow rate is greater than a predetermined value and assumes a positive value. When the differential flow rate is greater than the predetermined value and assumes a negative value, an appliance of some kind is determined to have deactivated its operation. The determination is taken as first determination, and the activated appliance determination unit 1009 and the deactivated appliance determination unit 1011 perform the first determination.

The differential flow rate is calculated by calculating a flow difference at specific time intervals (e.g., every four seconds) by use of an instantaneous flow rate measured at a predetermined time interval; for instance, every two seconds. The differential flow rate is called a four-second differential flow rate. Use of two-second interval measurement and a four-second differential flow rate is a mere exemplification, and another time interval may also be used on another occasion.

As in the present embodiment, from the viewpoint of low electric power consumption and the accuracy of measurement, it is suitable for the gas meter, which is driven by a battery and which utilizes ultrasonic waves, to use two-second interval measurement and a four-second differential flow rate that enable detection of a working flow in the gas appliance without overlooking operation of the gas appliance. It is obvious that flow measurement and appliance determination can be performed more accurately by performing measurement at a short time interval of one second or less. It is additionally noted that the four-second differential flow rate is sometimes described as a differential flow rate in the following descriptions.

Figure 13:
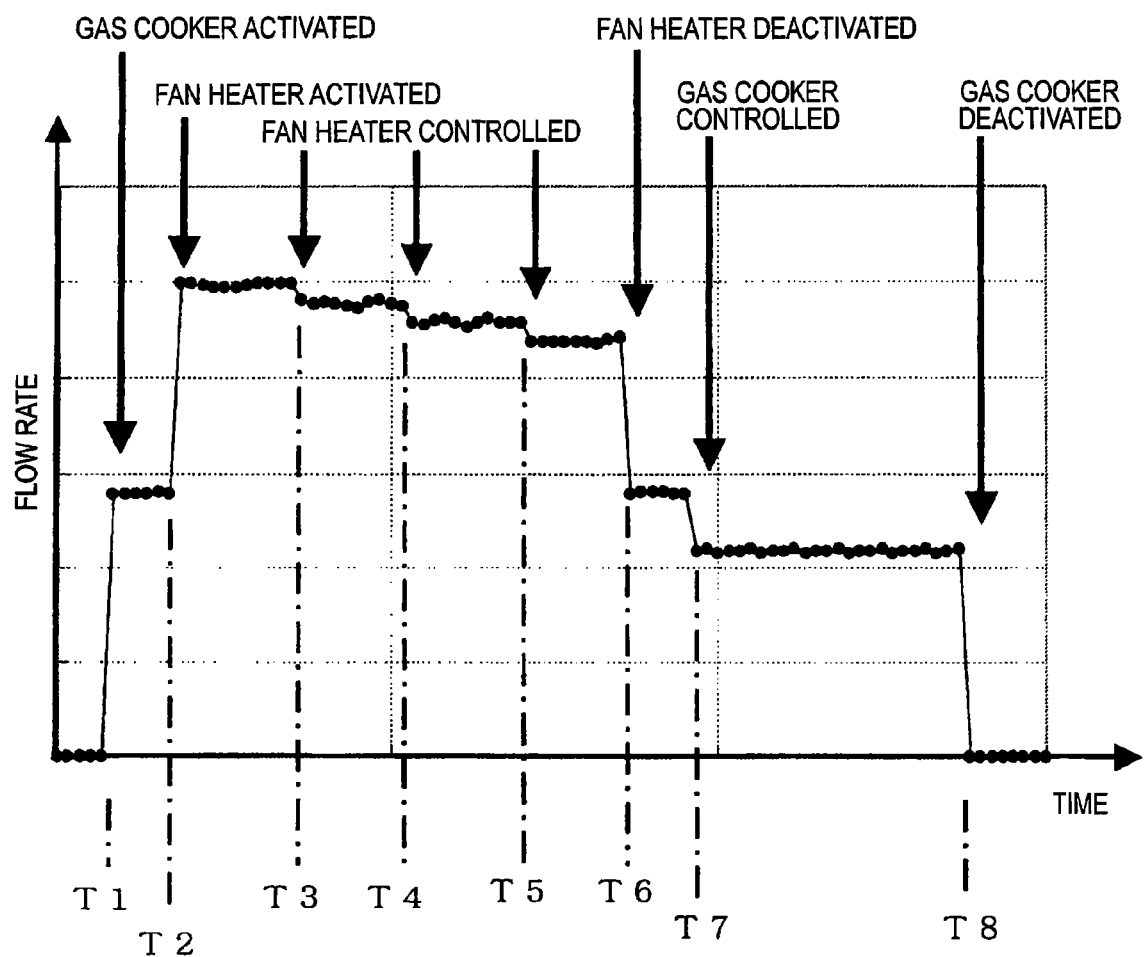
FIG. 13 is a characteristic diagram of a flow rate measured by the flow rate measuring apparatus.

The case of a change in flow, such as that shown in FIG. 13, will now be described. First, actual events are described in time sequence. A gas cooking stove 1020 serving as a gas appliance is activated at time T1. A fan heater 1021 serving as a gas appliance is subsequently activated at T2. Therefore, the measured flow is changed in two steps. Since the fan heater 1021 is subjected to flame regulation control at time T3, the flow is slightly decreased.

Such phenomena arose three times at T3, T4, and T5. A great decrease arose in the flow rate at time T6, whereupon the fan heater 1021 is deactivated. Further, a small decrease arises in flow at time T7, and a great decrease arises in flow at the last time T8, whereupon the measured flow comes to zero. Thus, the gas cooking stove 1020 is deactivated.

Figure 14:
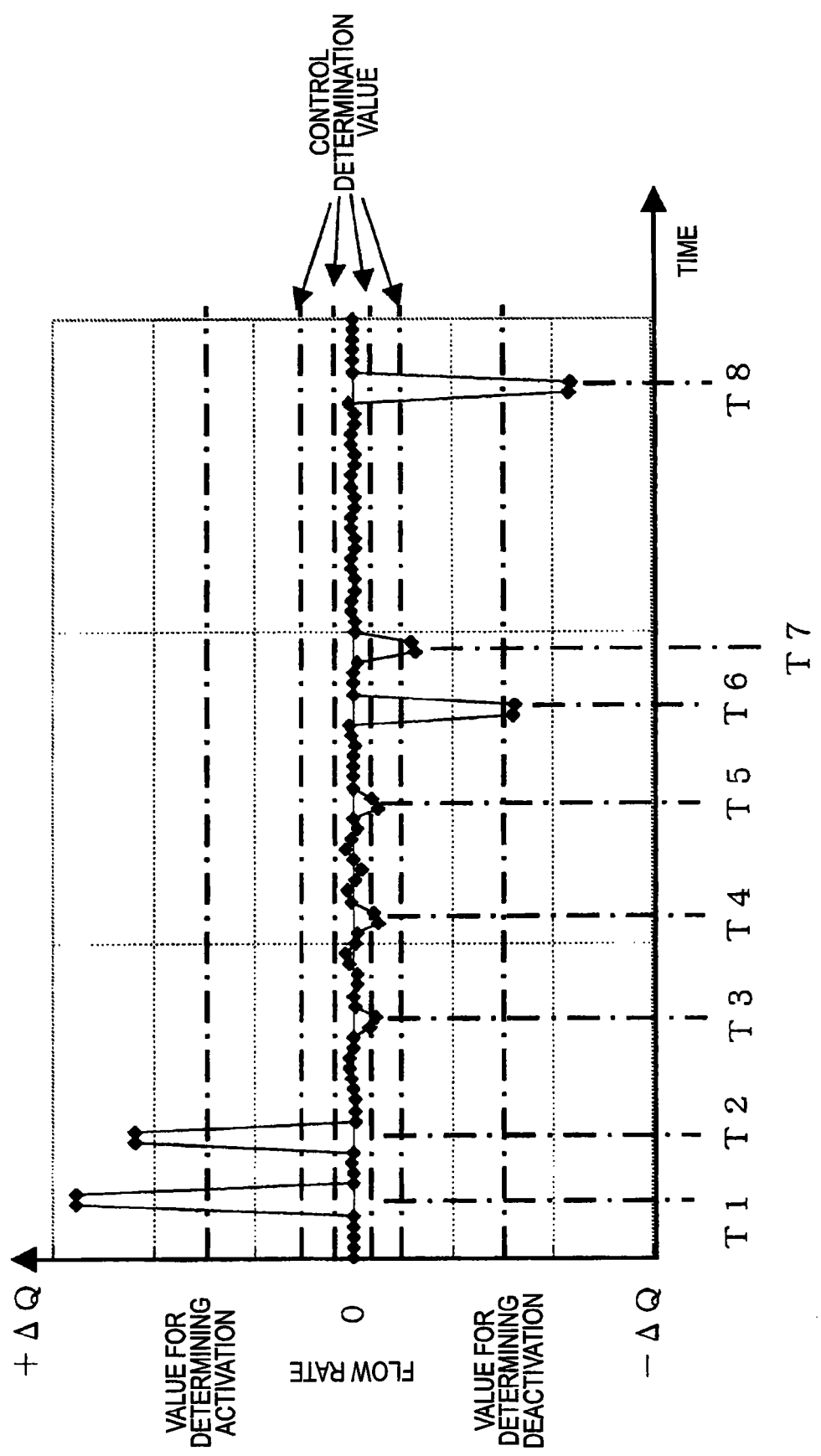
FIG. 14 is a characteristic diagram of a differential flow rate measured by the flow rate measuring apparatus.
Figure 15:
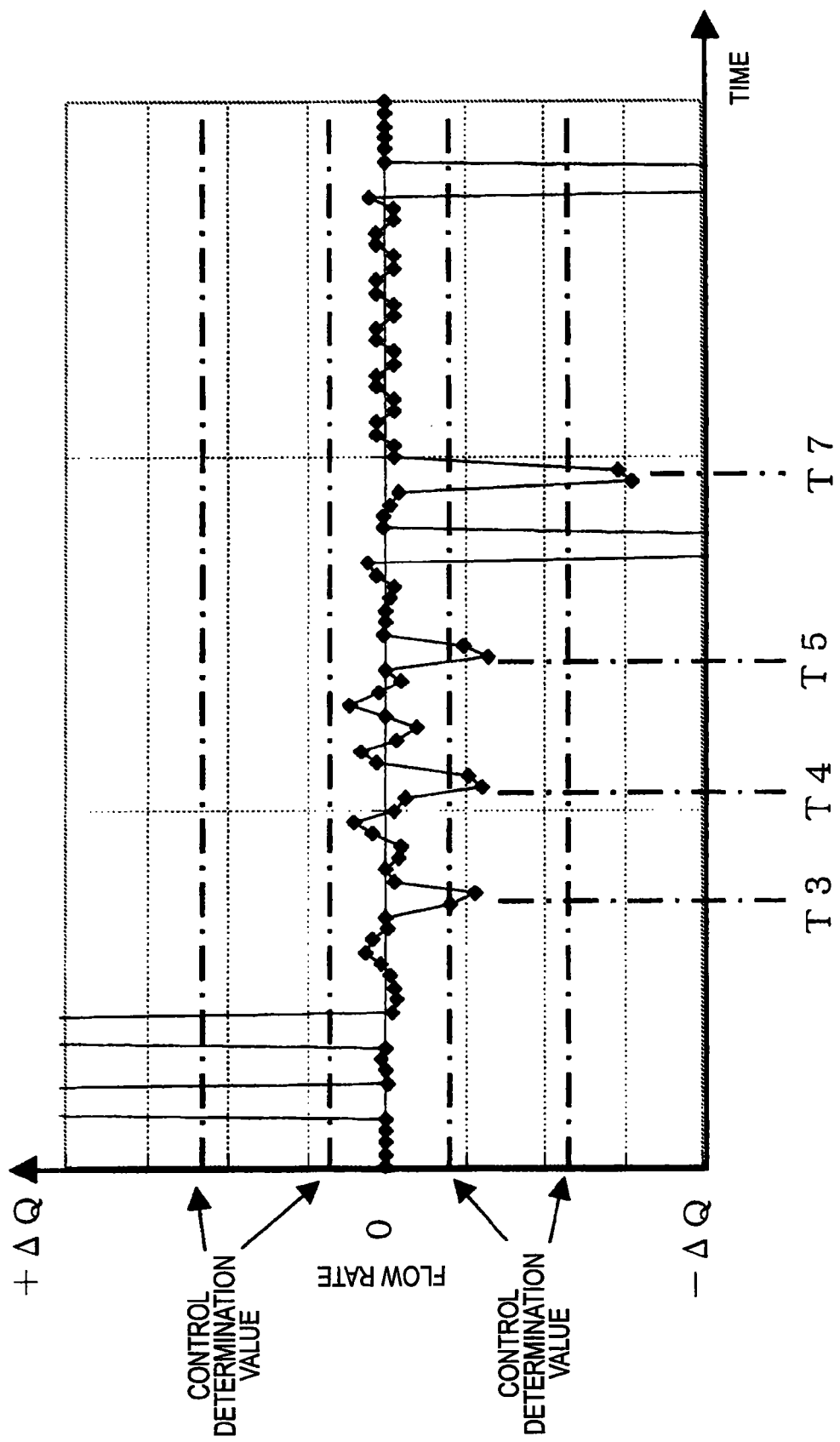
FIG. 15 is an enlarged view of a characteristic of a differential flow rate measured by the flow rate measuring apparatus.

The value of the four-second differential flow rate of such a phenomenon is calculated as shown in FIG. 14. A great differential flow rate is detected at times T1 and T2; and a great negative differential flow rate is detected at times T6 and T8. Activation and deactivation of the gas appliances are recognized as first determinations. However, it is difficult to recognize which one of the activated gas appliances is deactivated, from the differentials detected at T6 and T8.

Accordingly, a flow rate changing over time is estimated by use of a small differential flow rate achieved when the gas appliances are controlled as shown in FIG. 14 as well as a large differential flow rate, whereby the deactivated gas appliance can be determined as follows. This operation is called a second determination and performed by the instantaneous flow rate estimation unit 1010. The flow rate changing over time is calculated by the instantaneous flow rate estimation unit 1010.

Operation of the instantaneous flow rate estimation unit 1010 is now described. First, the instantaneous flow rate estimation unit 1010 calculates, based on the magnitude of a differential flow rate, an activated appliance to which the differential flow rate is related. For instance, when the differential flow rate is smaller than a control discrimination value shown in FIG. 15 (e.g., when the differential flow rate is 8 L or more and under 25 L), the differential flow rate is determined to be related to the fan heater 1021. Further, when the differential flow rate is large (e.g., when the differential flow rate is 25 L or more and under 75 L), the differential flow rate is determined to be a differential flow rate of the gas cooking stove 1020 (in a case where the control discrimination value is ±8 L and ±125 L; a start discrimination value is 75 L; and a stop discrimination value is −75 L).

The reason why the discrimination values are determined as mentioned above is that a minute change in the flow rate; namely, a differential flow rate, arises because the fan heater 1021 is automatically controlled by an electronic circuit. Therefore, the minute quantity of differential flow rate is determined to be operation of the fan heater 1021. Since flames of the gas cooking stove 1020 are primarily, manually regulated, a large change arises in the flow rate. By utilization of this fact, a great differential flow rate is determined to be a differential flow rate of the gas cooking stove 1020.

So long as differential flow rates of respective gas appliances are previously determined according to magnitudes of the differential flow rates, the instantaneous flow rate to a gas appliance can be estimated by adding or subtracting a differential flow rate $\Delta Qi$ to or from an activation flow $Qs$ achieved at the time of activation of a gas appliance. The estimated instantaneous flow rate Q is calculated as $Q=Qs+\Sigma\Delta Qi$. The flow rate Q is calculated for each gas appliance one after another. When the differential flow rate does not exceed the control discrimination value, the estimated flow rate achieved at that time is maintained.

The flow rate is estimated on each occasion, to thus successively recognize flow rates at which the gas appliances are now operating every moment. The instantaneous flow rate achieved immediately before deactivation of the gas appliance is calculated. The differential flow rate achieved when the gas appliance is deactivated comes to an instantaneous flow rate achieved immediately before deactivation; hence, a deactivated gas appliance can be determined by comparing the estimated instantaneous flow rate with a differential flow rate for the time of deactivation determined by the deactivated appliance determination unit.

As mentioned above, even when a plurality of gas appliances are simultaneously used, the instantaneous flow rate estimation unit 1010 can successively recognize gas appliances being used and instantaneous flow rates at which the gas appliances are being used. Therefore, the deactivated appliance determination unit 1011 measures a differential flow rate achieved when a gas appliance is deactivated and compares the instantaneous flow rate calculated by the instantaneous flow rate estimation unit 1010 with the differential flow rate achieved at the time of deactivation, thereby making it possible to determine a deactivated appliance with superior accuracy. As a result of use of a first determination for determining the activation and deactivation of a gas appliance and a second determination for estimating instantaneous flow rates of individual gas appliances, a total amount of gas used by the respective gas appliances can be calculated on a per-gas-appliance basis by integrating the estimated instantaneous flow rates.

In order to determine deactivation of the gas appliance, the deactivated appliance determination unit corresponding to the first determination performs determination. There are cases where the flow rate achieved immediately before deactivation is smaller than the stop discrimination value as a result of changes having arisen in the flow rate of the gas appliance several times. At this time, a method for determining deactivation of a gas appliance of interest when the estimated instantaneously flow rate is substantially equal to the differential flow rate is also additionally provided, whereby deactivation of an appliance can be determined even when the usage flow rate used by the gas appliance has become small.

When only one gas appliance is operating, activation or deactivation of the gas appliance can be readily determined without involvement of such determination. Hence, the determination method is also changed according to the number of operating gas appliances with consideration.

Figure 16:
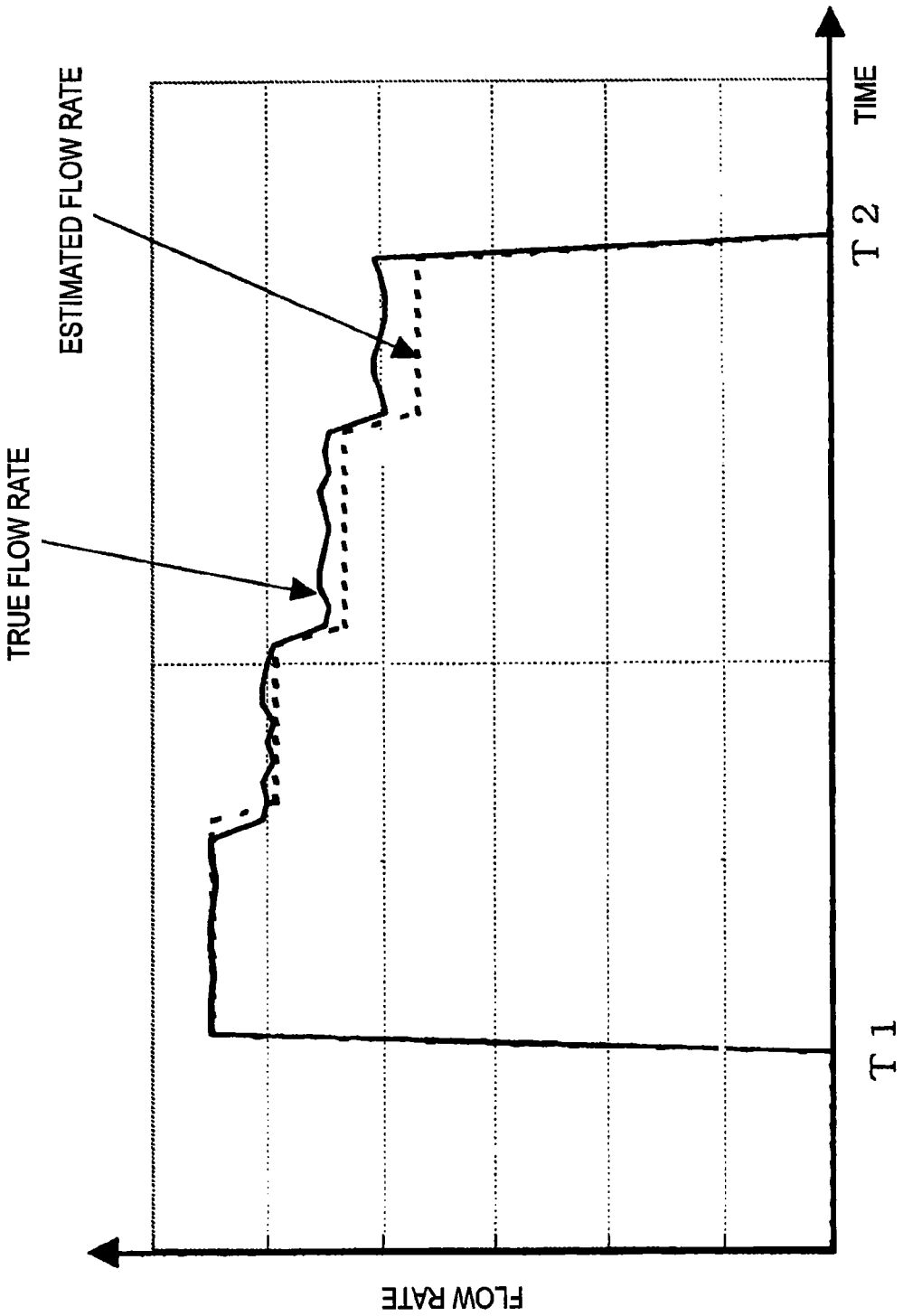
FIG. 16 is a characteristic diagram of a flow rate measured by the flow rate measuring apparatus.

As shown in FIG. 16, since the gas appliance to be added is determined according to the magnitude of a differential flow rate, the instantaneous flow rate is often estimated with an involvement of an error when a change arises in a differential flow rate that is smaller than the control discrimination value. In order to make a correction to such an error, the instantaneous flow rate estimation unit 1010 compares the total flow rate measured by the ultrasonic flow meter 1007 with the sum of flow rates of the respective gas appliances estimated by the instantaneous flow rate estimation unit 1010; and detects an instantaneous flow rate while making a correction to the flow rate.

For instance, the instantaneous flow rate estimation unit 1010 calculates instantaneous flow rates of respective gas appliances by estimation; however, a sum total $\Sigma Q$ of estimated instantaneous flow rates must match the measured flow rate Qusm measured by the ultrasonic flow meter. By utilization of the property, a correction is made to a flow rate of any of the gas appliances. A correction method is to make a correction to the estimated flow rate Qg of the gas cooking stove 1020 by calculating that the estimated flow rate Qf of the fan heater 1021 involving a small differential flow rate is correct. The corrected flow rate to the gas cooker 1020 is expressed as $Qg'=Qg+\Delta Q0$. Thus, the flow rate of the appliance in which an error has arisen can also be corrected.

The reason for this is that only a predetermined differential flow rate arises in the fan heater 1021 because the fan heater is controlled by an electronic circuit; and that the fan heater is frequently operated for a long period of time and considered to cause small errors. If $Qusm=Qf+Qg$ does not stand, the flow rate of the gas cooking stove 1020 is corrected by taking a difference $\Delta Q0=Qusm-\Sigma Q$ as a correction value.

As mentioned above, high-precision determination of an appliance can be implemented by making a correction to an estimated flow rate. Appliance-specific flow rates of the respective gas appliances can be computed by determining an appliance being used based on a flow rate measured by the ultrasonic flow meter, so that customer service, such as an appliance-specific fee, can be realized.

Although the above descriptions are provided for the case where the ultrasonic flow meter is used, it is manifest that similar advantages are yielded by another instantaneous flow rate measurement unit. Measurement timing can be set at uniform time intervals regardless of flow rate by use of the ultrasonic flow meter. Hence, a gas appliance being used can be determined at good timing regardless of a flow rate of the gas appliance.

The operation section 1016 can register connected gas appliances, and the display section 1017 can display specifics of registration and data pertaining to a gas usage quantity for each gas appliance. Since the instantaneous flow rate of each gas appliance is estimated and grasped, occurrence of an anomaly can be momentarily detected with the gas usage quantity, and gas can be early shut off by a passage shutoff valve 1015.

Since an appliance determination function can be added in the form of software for a microcomputer without addition of hardware, the software can be readily installed in the battery-operated gas meter 1014. In particular, when gas appliance to be subjected to appliance determination is limited to specific gas appliances, advantages can be more effectively yielded.

Fourth Embodiment

Figure 17:
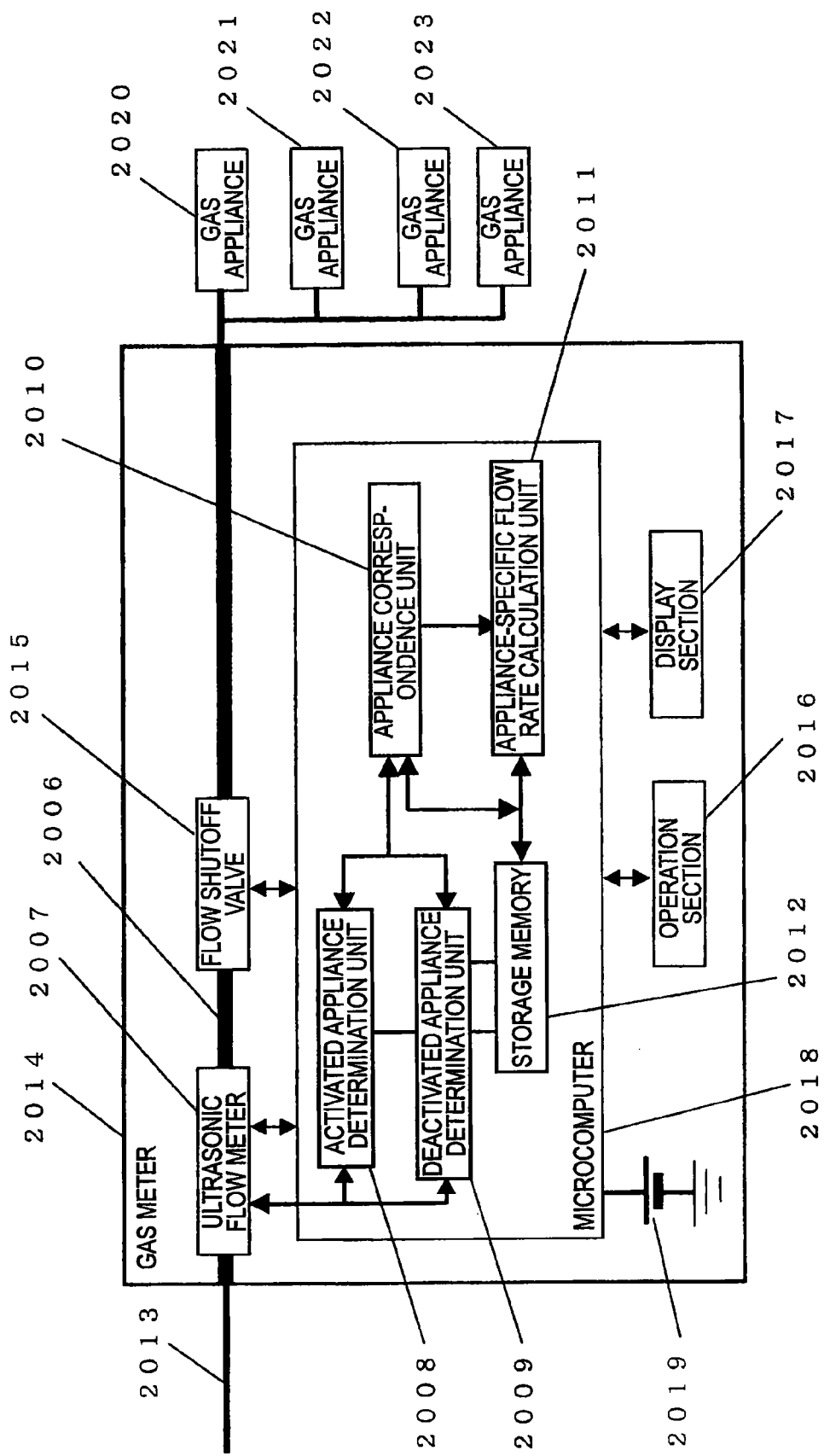
FIG. 17 is a block diagram of a flow rate measuring apparatus of a fourth embodiment of the present invention.
Figure 18:
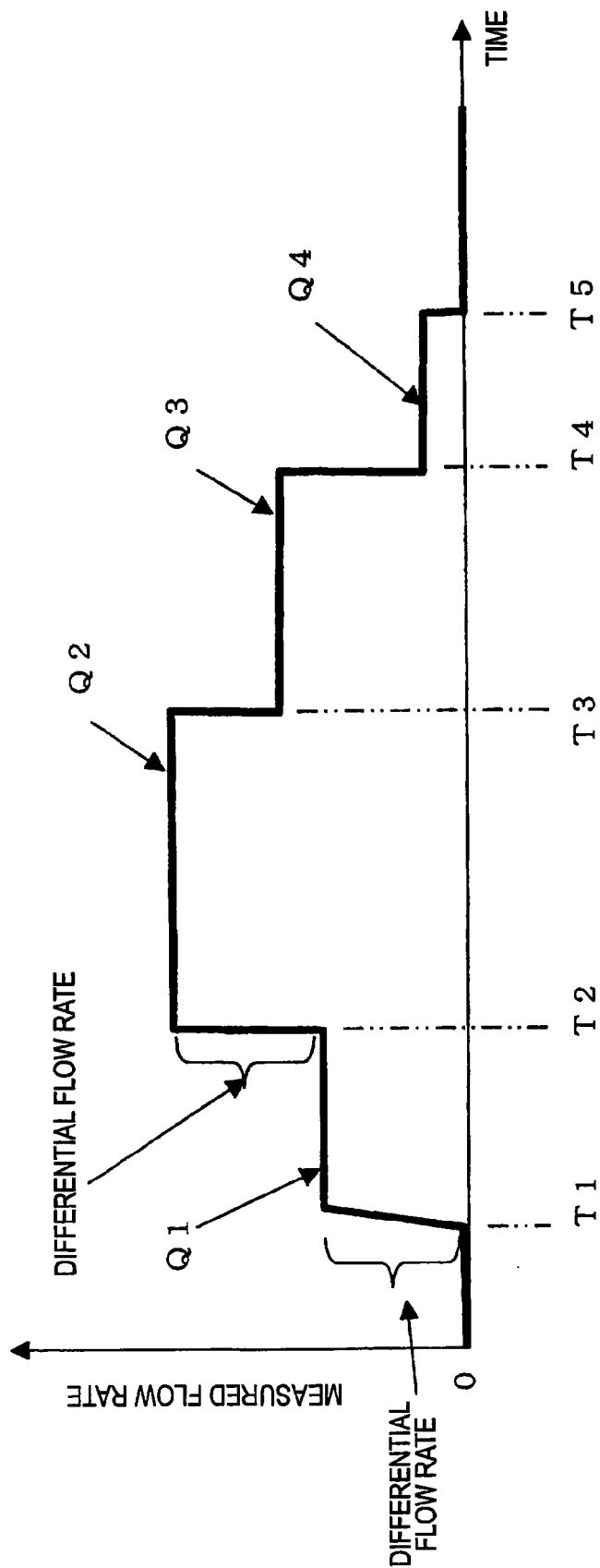
FIG. 18 is a pattern of a flow rate measured by the flow rate measuring apparatus.

FIG. 17 shows a block diagram of a gas meter serving as a flow rate measuring apparatus of a fourth embodiment of the present invention.

In FIG. 17, the gas meter has an ultrasonic flow meter 2007 serving as a flow rate measurement unit that measures the flow rate passing through a passage 2006; an activated appliance determination unit 2008 that determines an appliance to be used by being connected to the passage, based on a specific interval differential flow rate of a flow rate measured at predetermined timing intervals by the ultrasonic flow meter 2007; a deactivated appliance determination unit 2009 that determines a deactivated appliance based on the specific interval differential flow rate and that selects and determines any from among activated appliances based on deactivation determination conditions; and an appliance correspondence unit 2010 that defines a correspondence between an activated appliance and a deactivated appliance. Further, the gas meter has an appliance-specific flow rate calculation unit 2011 that calculates a flow rate of an appliance associated by the appliance correspondence unit 2010. Reference numeral 2012 designates storage memory for storing flow rate information about the ultrasonic flow meter 2007 such as an instantaneous flow rate and a differential flow rate, timing information such as a time of occurrence of information (a starting time and a stop time) or a duration time of flow, and determination condition information such as conditions for determining activation and deactivation of an appliance; 2013 designates a gas passage; 2014 designates a gas meter serving as a flow rate measuring apparatus; 2015 designates a passage shutoff valve that cuts off the passage 2006 when cutoff of a gas is desired; 2016 designates an operations section; 2017 designates a display section that displays a flow rate; 2018 designates a microcomputer that performs control of operations of the elements and arithmetic operation; 2019 designates a battery; and 2020 to 2023 designate gas appliances connected to the gas passage.

Operation and working-effects of the above-configured gas meter will now be described.

There now be described operation and a method for determining an activated appliance and a deactivated appliance by reference to FIGS. 18 through 25.

Determination operations of the activated appliance determination unit 2008 and the deactivated appliance determination unit 2009 are performed by use of differential flow rates between instantaneous flow rates measured at two seconds corresponding to a predetermined time interval. In relation to the differential flow rate used herein, a period that is double the predetermined time interval is used as a specific interval, and a flow difference achieved during four seconds is used as a specific interval differential flow rate. The differential flow rate is herein called a four-second differential flow rate.

When the four-second differential flow rate is greater than the predetermined flow rate and assumes a positive value, any appliance is determined to be activated. In contrast, when the four-second differential flow rate is greater than the predetermined flow rate and assumes a negative value, any appliance is determined to be deactivated.

Use of two-second interval measurement and a four-second differential flow rate is a mere exemplification, and another time interval may also be used on another occasion. In the case of a battery-operated gas meter utilizing ultrasonic waves as in the present embodiment, use of a four-second differential flow rate acquired through measurement performed every two seconds is preferable from the viewpoint of lower power consumption and precision of measurement. Specifically, the four-second difference makes it possible to prevent overlooking of operation of an appliance and detect a working flow of the appliance.

When the four-second differential flow rate is equal to a flow rate registered as a condition for determination or falls within a flow range of an appliance of interest, the appliance is determined as a predetermined appliance from the differential flow rate, and an determination is made as to whether the appliance is activated or deactivated.

For instance, when a flow rate used is in a low flow range, many gas appliances are present. Accordingly, it is difficult to determine an appliance by only a differential flow rate, and a determination is made by taking into account the behavior of the differential flow rate. In a case like a flow rate change characteristic diagram shown in FIG. 18, a gas fan heater serving as a gas appliance 2020 is activated at time T1, and the gas cooking stove serving as a gas appliance 2021 is then activated at time T2. Flames of the gas cooking stove are regulated to a low flow side at time T3; the gas fan heater is deactivated at time T4; and the gas cooking stove is deactivated at time T5.

Figure 19:
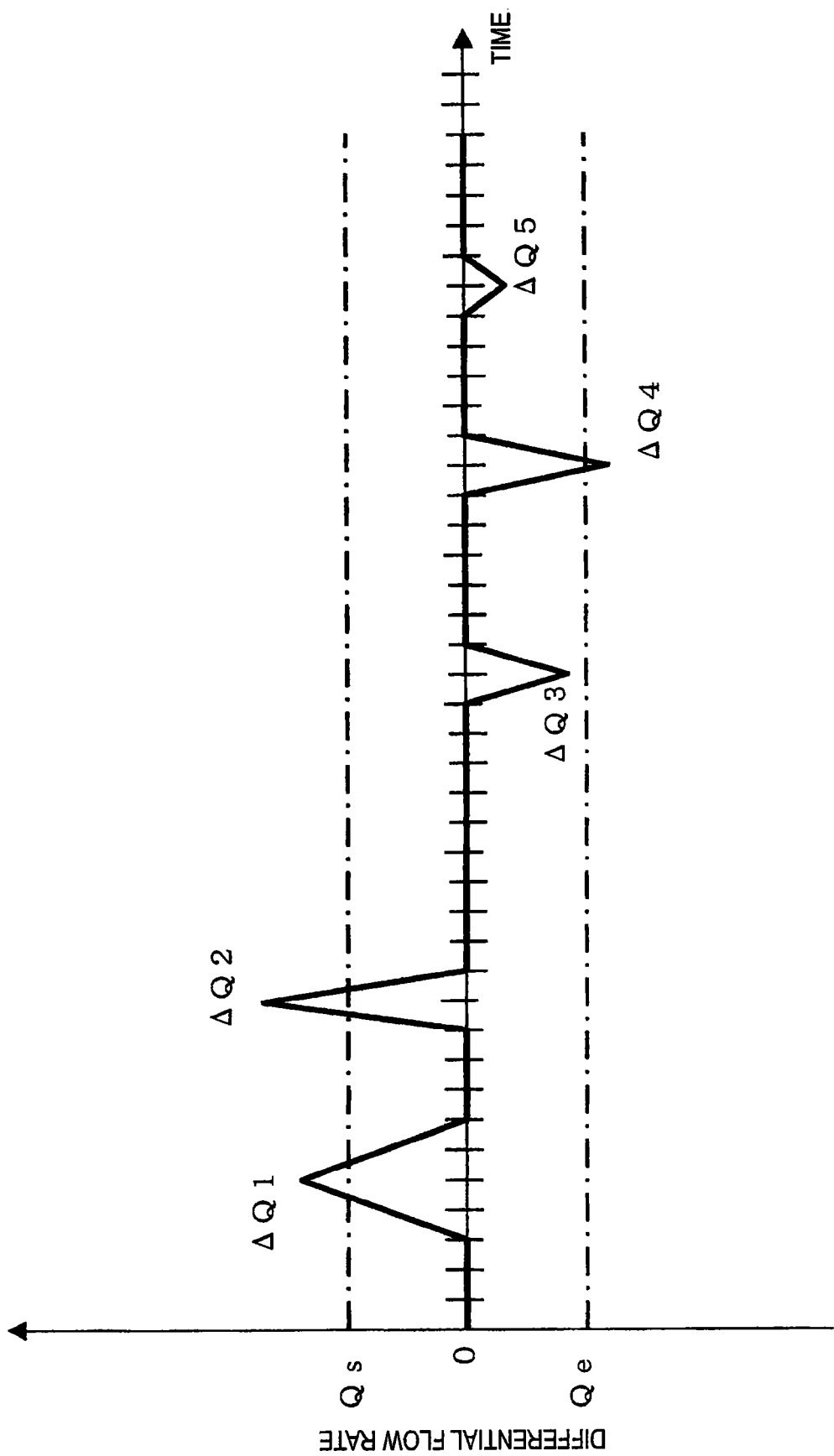
FIG. 19 is a pattern of the differential flow rate measured by the flow rate measuring apparatus.

In the case of such a characteristic, the activated appliance determination unit 2008 determines, by a flow rate change characteristic of a four-second differential flow rate shown in FIG. 19, an appliance of interest as a gas fan heater by utilization of the fact that at time T1 the differential flow rate is larger than the flow rate Qs in the conditions for determining an activated appliance and a rise in differential flow rate is gentle.

At time T2, the differential flow rate is greater than the flow rate Qs in the conditions for determining an activated appliance, and a rise in differential flow rate is abrupt; hence, the differential flow rate matches the conditions for determining activation of a gas cooking stove. Thus, the activated appliance determination unit 2008 determines an appliance of interest as a gas cooking stove. These conditions are stored in advance in the storage memory, and the degree of gentleness of the rise is numerically set. These conditions are rewritten and modified into appropriate conditions in each house.

A fall in differential flow rate is detected at time T3. However, since an absolute value of the differential flow rate is smaller than the flow rate Qe in the conditions for determining a deactivated appliance, the appliance of interest is not determined as a deactivated appliance.

At time T4, the absolute value of the differential flow rate exceeds the predetermined threshold value Qe, and hence an appliance of some kind is determined as having been deactivated. An determination is made as to which one of the gas fan heater and the gas cooking stove, both of which are appliances determined as being activated, is deactivated.

Since heating power of the gas cooking stove is regulated in midstream, it becomes extremely difficult to determine an appliance from only a differential flow rate at a falling edge. Accordingly, by determination of a flow rate measured in the next measurement time, it is understood that an extremely-small quantity of gas whose absolute flow rate is Q4 flows though the appliance.

The flow is a small flow rate (a value of the quantity is also set as conditions for determination) arising only when heating power of the gas cooking stove is reduced, and hence the gas cooking stove is understood to be used from time T4 to T5.

The appliance deactivated at time T4; namely, the appliance deactivated in midstream, is understood to be a gas fan heater by subtracting the gas cooking stove operated to the end from the appliances determined to be activated.

Although a slight fall has arisen in the differential flow rate at time T5, the fall does not exceeds the threshold value Qb, and hence the appliance is not determined to be a deactivated appliance. However, since a subsequently-measured flow rate has come to zero, the deactivated appliance determination unit 2009 determines that all of the activated appliances are deactivated. From among the remaining activated appliances, the gas cooking stove is determined to be deactivated at time T5.

As mentioned above, the deactivated appliance determination unit can specify an appliance by a flow rate measured after deactivation and selectively determine the deactivated appliance from among the activated appliances.

The appliance correspondence unit 2010 can specify the manner of usage of each of the appliances by checking a result of determination made by the activated appliance determination unit with a result of determination made by the deactivated appliance determination unit. In the present embodiment, the appliance correspondence unit 2010 defines a correspondence such that a period from time T1 to time T4 is an operating time period of the gas fan heater, and that a period from time T2 to time T5 is an operating time period for the gas cooking stove.

The appliance-specific flow rate calculation unit 2011 can approximately calculate the usage flow rate used by the gas fan heater by multiplexing the usage flow rate used by an associated appliance, a differential flow rate Q1 achieved at the time of activation, an average flow rate of a differential flow rate (Q3−Q4) achieved at the time of deactivation, and a time at which the appliance is used; namely, a difference between T4−T1. Specifically, the quantity Q of flow used by the gas fan heater is derived from Q=(Q1+Q3−Q4)/2*(T4−T1)*3600.

In the case of the gas cooking stove, under the condition of a change having arisen in the flow rate in midstream and two gas appliances having operated, the usage flow rate can be calculated from a value that is calculated by subtracting the flow rate of the gas fan heater from the total flow rate.

As mentioned above, the appliance correspondence unit 2010 makes clear operating times of the respective appliances, whereby the quantity of gas flow used by each of the appliances can be individually calculated.

Figure 20:
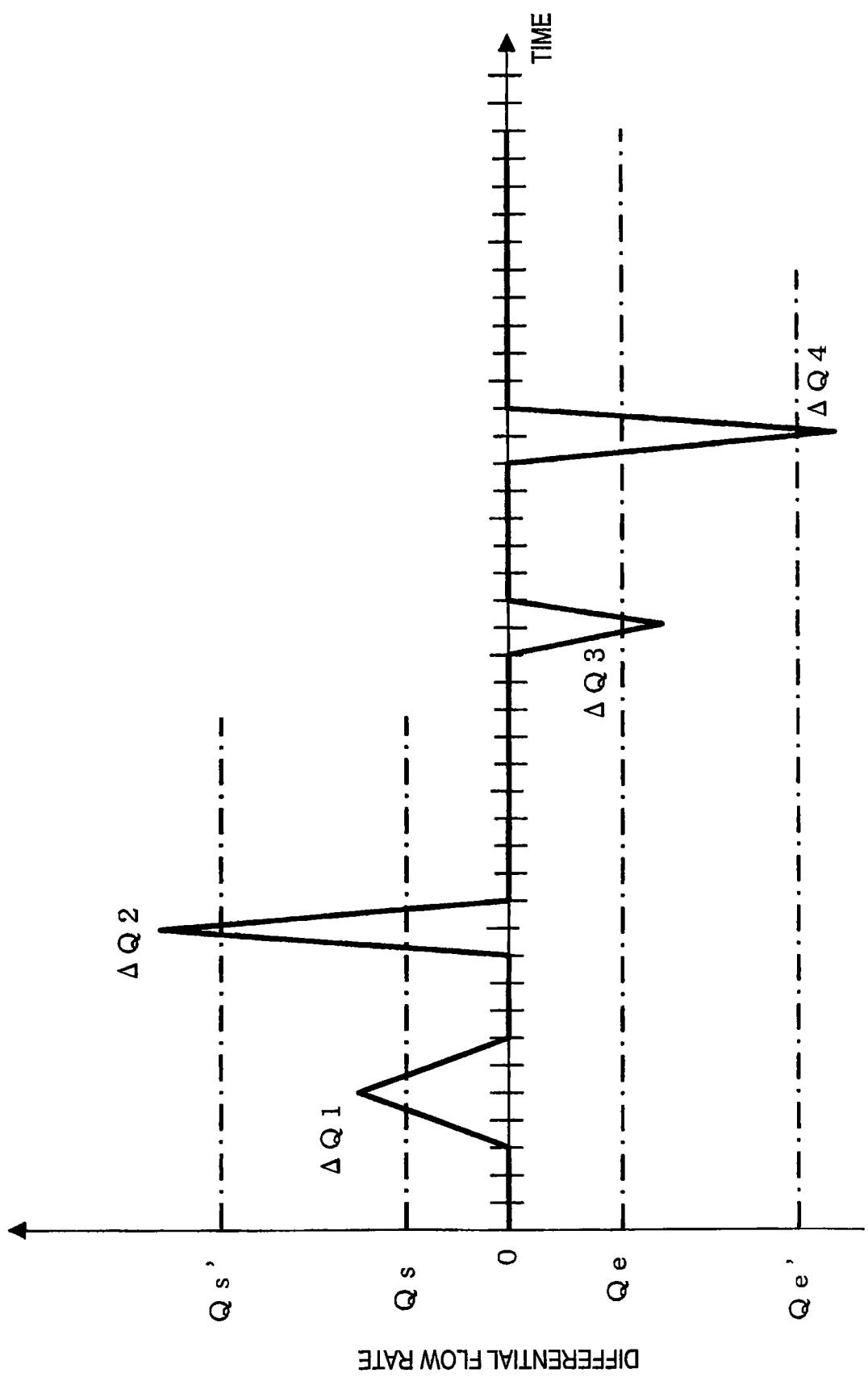
FIG. 20 is another pattern of the differential flow rate measured by the flow rate measuring apparatus.

There will now be described a case where there is used a gas hot water supply serving as a gas appliance 2022 that consumes a large flow rate, as in the case of a change in differential flow rate shown in FIG. 20. The descriptions are based on assumption that differential flow rates Qs and Qs' of the activated appliance determination conditions are set to a value of 100 L or more and a value of 400 L or more, respectively. Likewise, the differential flow rates Qe and Qe' in the negative range are also set to −100 L or less and −400 or less, respectively.

When the gas hot water supply is used, a four-second differential flow rate of large quantity is detected, and the thus-detected flow conforms to a condition of 400 L or more for the four-second differential flow rate that is an activated appliance determination condition for the case of the gas hot water supply. Therefore, the activated appliance determination unit 2008 can specify the activated appliance as a gas hot water supply. Conversely, even in determination of a deactivated appliance, a differential flow rate of large quantity is likewise detected, and hence the gas hot water supply is determined to be deactivated.

As mentioned above, in the case of an appliance involving a large flow rate like a gas hot water supply, the appliance can be specified by an absolute value of a differential flow rate.

Figure 21:
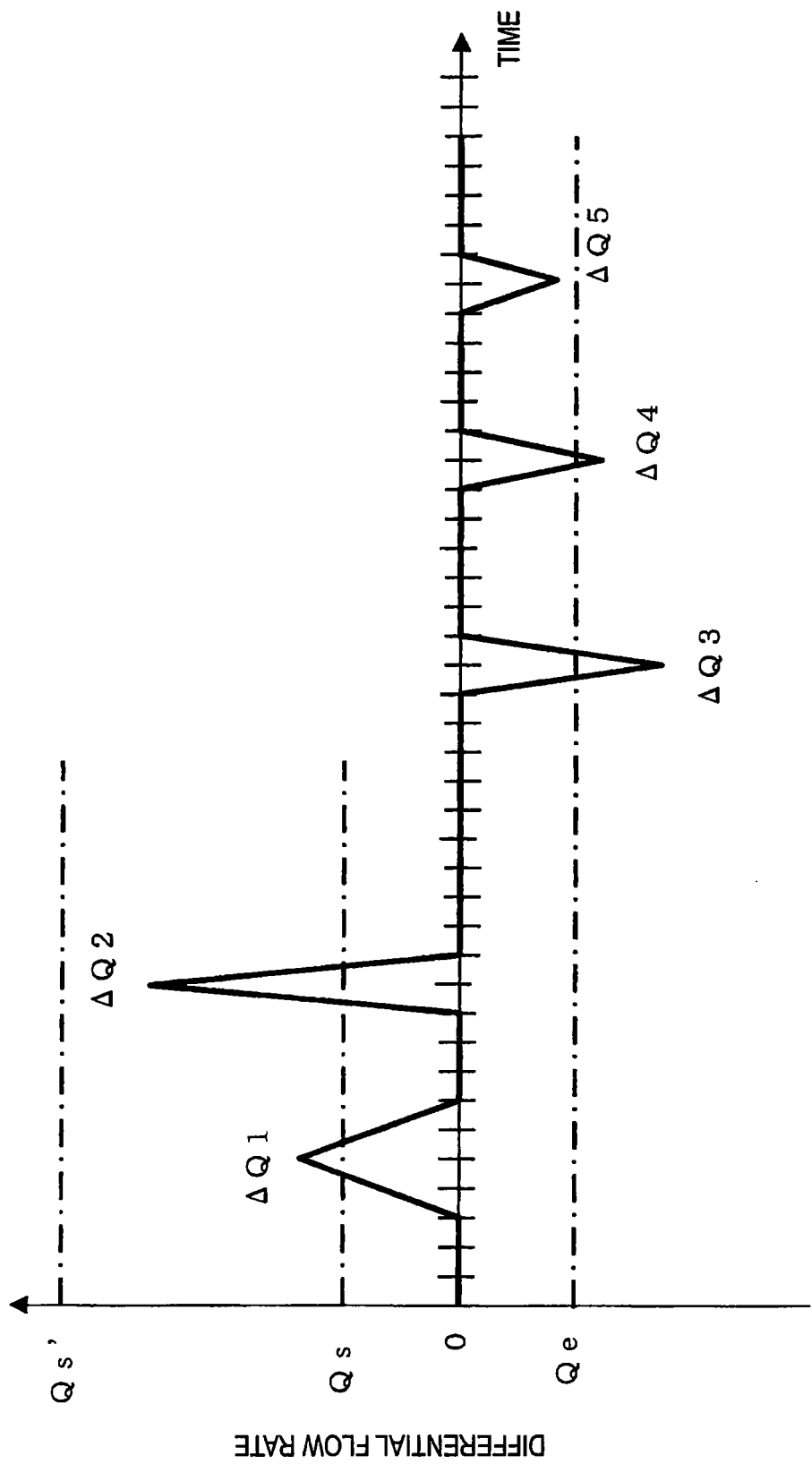
FIG. 21 is another pattern of the differential flow rate measured by the flow rate measuring apparatus.

As shown in FIG. 21, although the activated appliance determination unit 2008 calculates that the appliance is activated at $\Delta Q1$ and $\Delta Q2$, the deactivated appliance determination unit 2009 calculates that an appliance is deactivated at $\Delta Q3$ and $\Delta Q4$. Further, a result shows that another appliance is subsequently deactivated at $\Delta Q5$. The result corresponds to a pattern in which two appliances are simultaneously used at $\Delta Q2$. When two appliances are simultaneously used, difficult is encountered in making a determination from only a differential flow rate.

When a deactivated appliance is determined at $\Delta Q5$, two deactivated appliances are already determined at this point in time, and an activated appliance is not left. Hence, the deactivated appliance is determined as an unknown appliance. Although the appliance is unknown at this point in time, data pertaining to flow differences in the past are again searched at a point in time when the total flow rate comes to zero. It is detected that differential data achieved at a point in time $\Delta Q2$ is large, and two appliances are determined to have been simultaneously activated at this point in time, whereby the result indicating that the appliance of interest is determined as an unknown appliance is corrected, and the thus-corrected appliance can be associated with an activated appliance. For instance, the appliance is determined as a gas cooking stove based on the differential flow rate.

Figure 22:
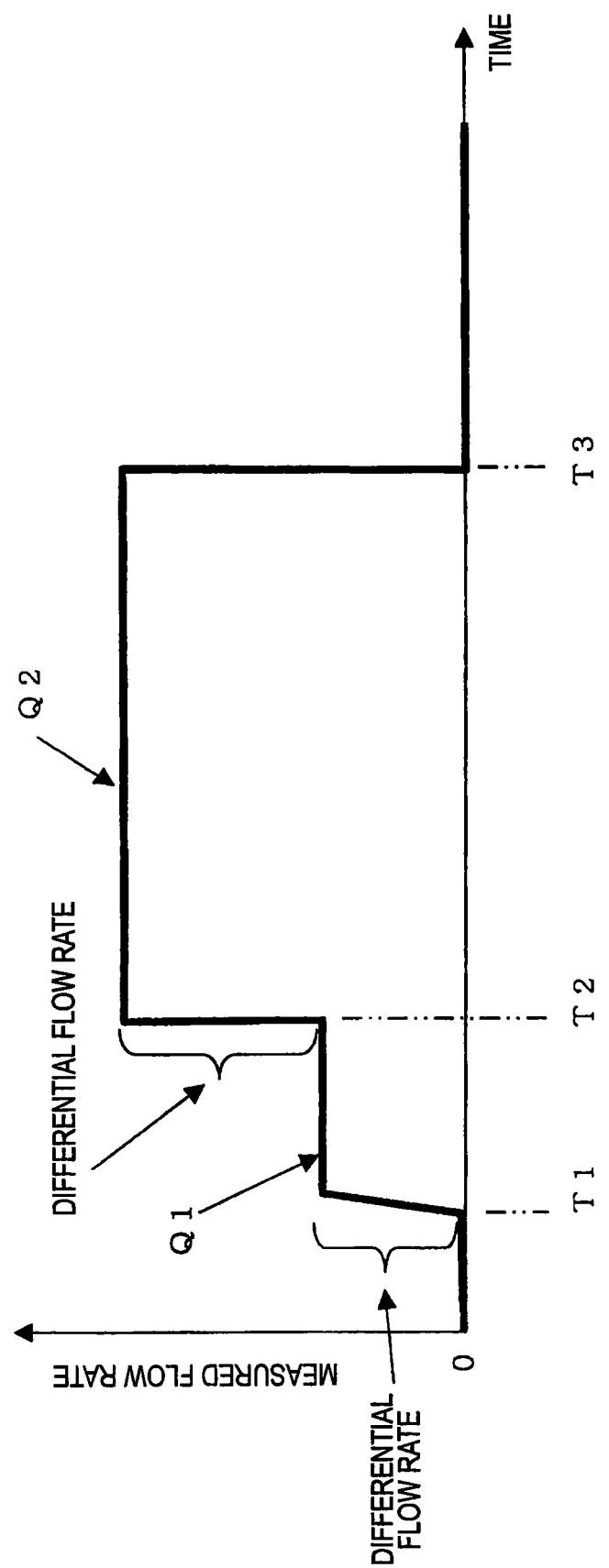
FIG. 22 is another pattern of the flow rate measured by the flow rate measuring apparatus.
Figure 23:
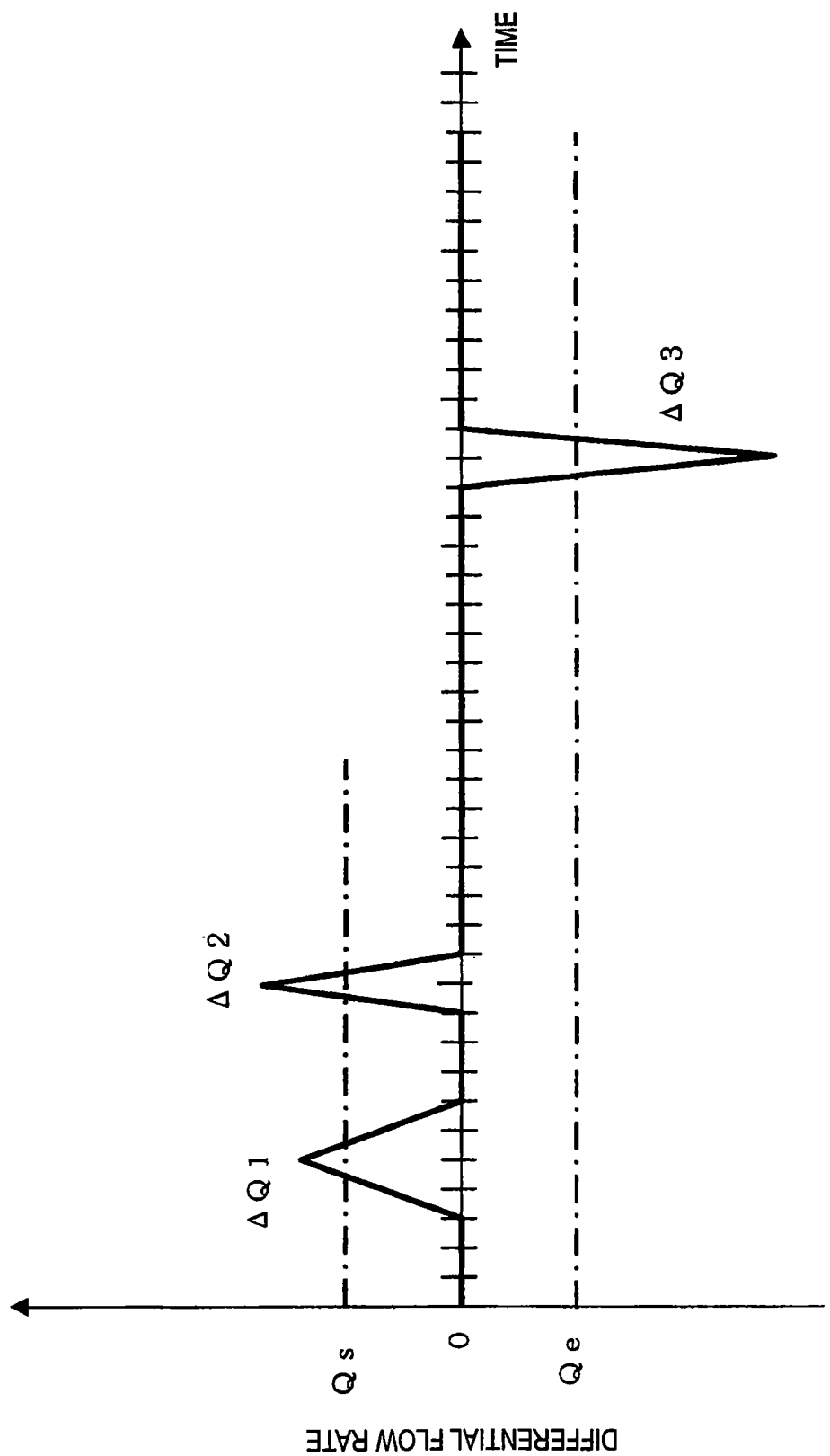
FIG. 23 is another pattern of the differential flow rate measured by the flow rate measuring apparatus.

In the case of characteristics shown in FIGS. 22 and 23, two appliances are determined through activated appliance determination, whereas one deactivated appliance (a deactivated appliance is determined to be one because a differential flow rate shows one peak) is determined through deactivated appliance determination. The measured flow rate also comes to zero, and it is detected that there is no operating appliance.

In such a case, all of the appliances are determined to be deactivated, and two appliances activated at time T3 are determined to be deactivated. Such a determination makes it possible to determine a deactivated appliance when a plurality of appliances are simultaneously deactivated.

Figure 24:
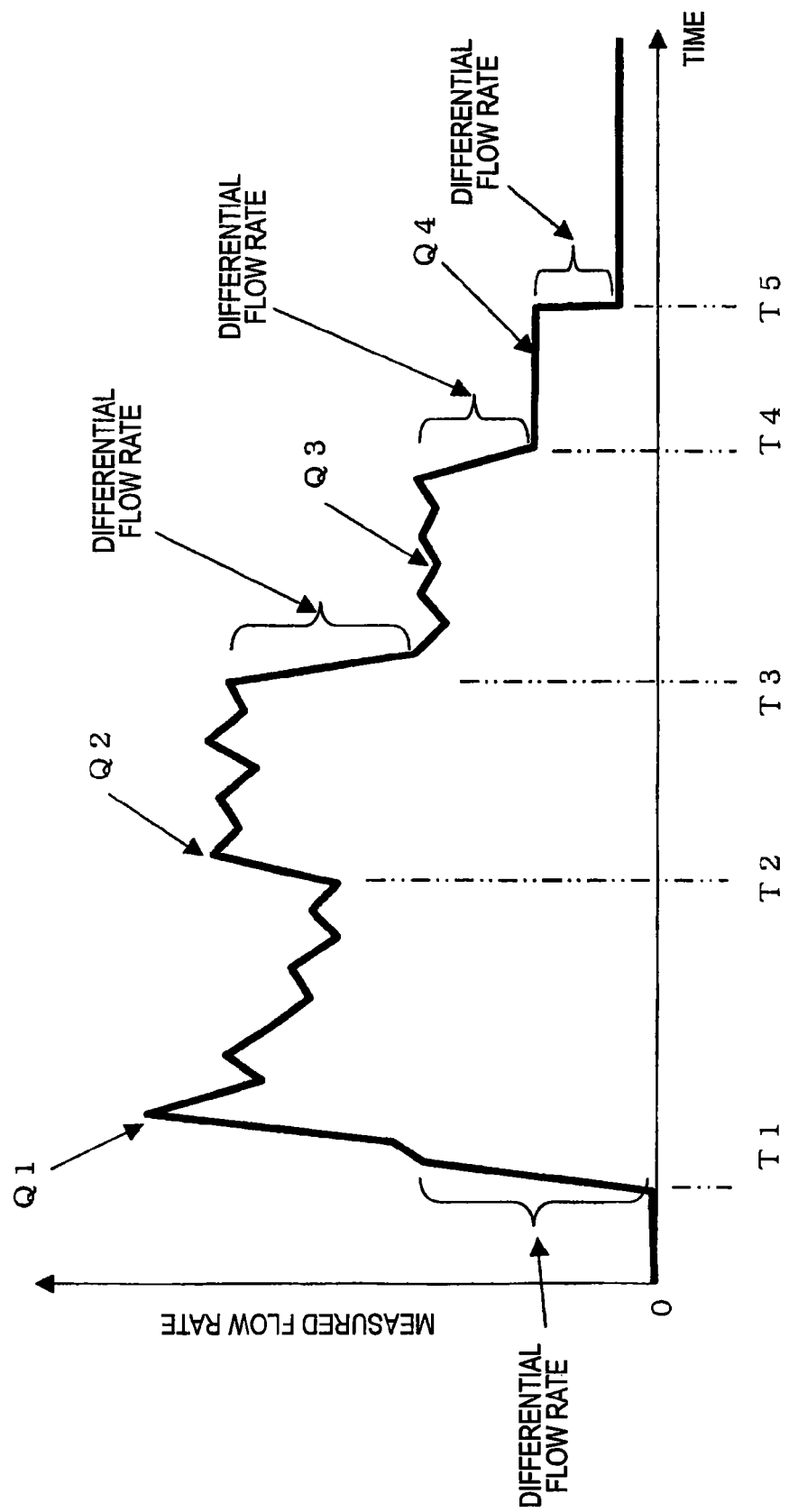
FIG. 24 is another pattern of the flow rate measured by the flow rate measuring apparatus.
Figure 25:
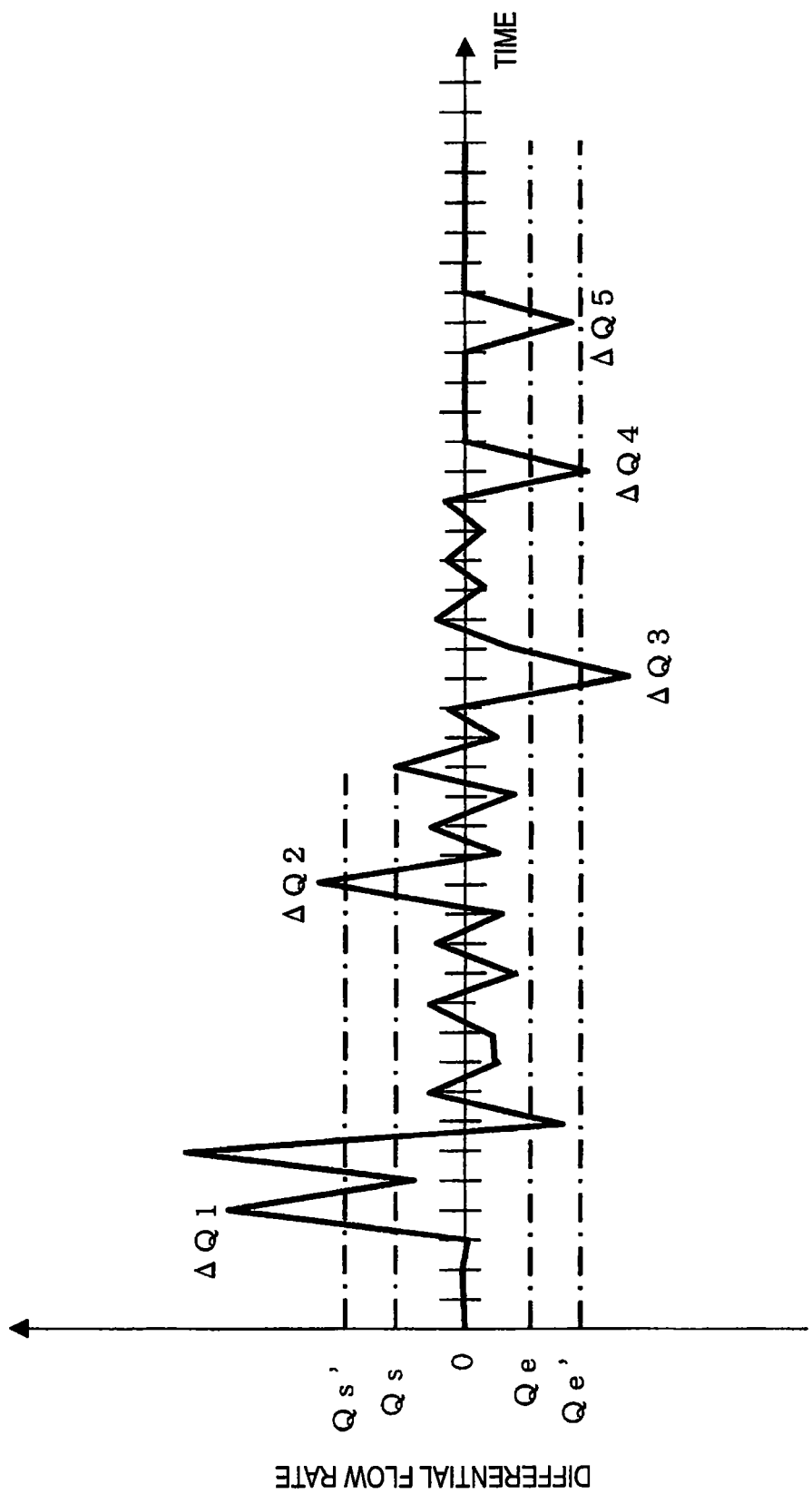
FIG. 25 is a pattern of the differential flow rate measured by the flow rate measuring apparatus.
Figure 26:
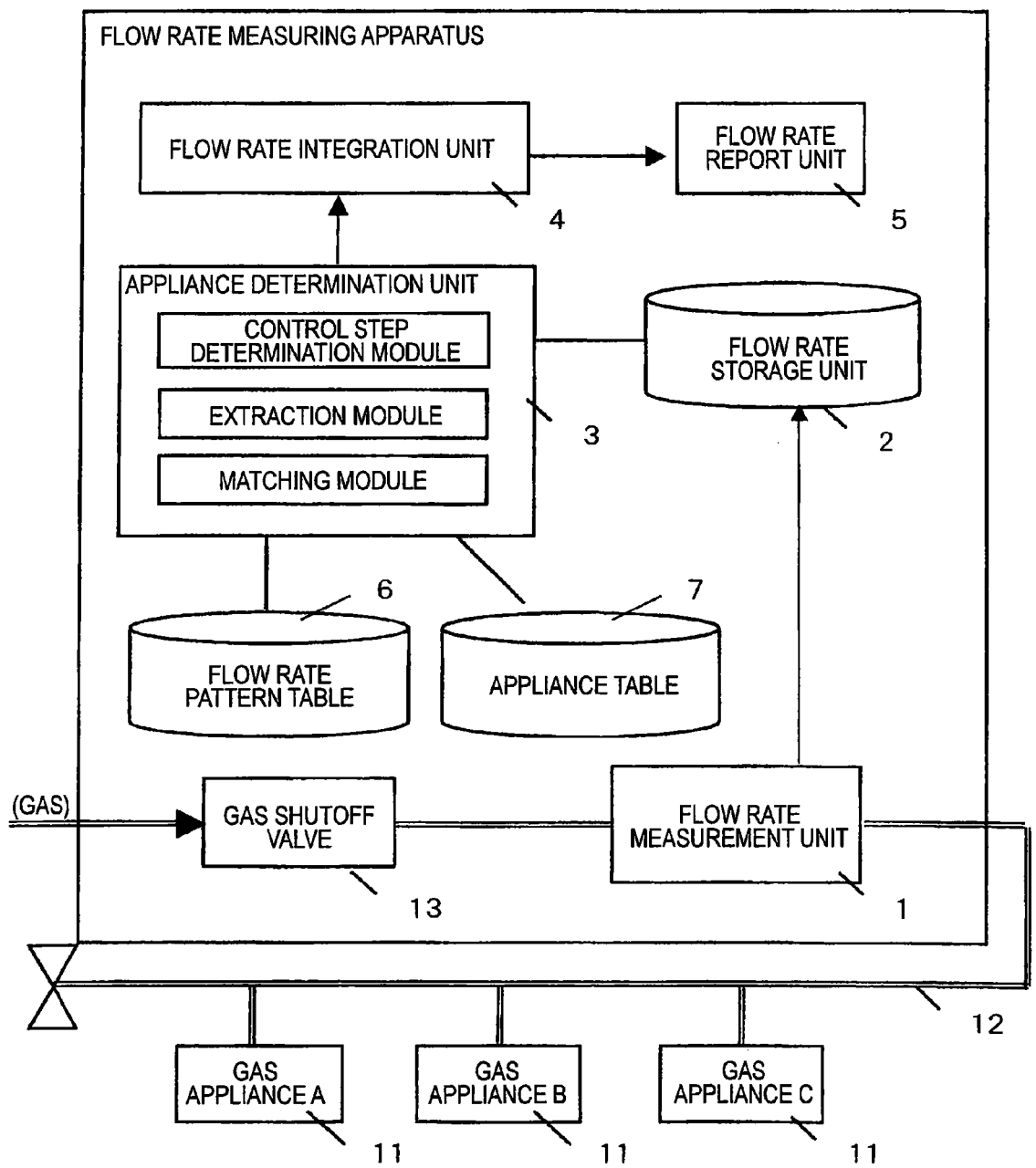
FIG. 26 is a block diagram of a related-art flow rate measuring apparatus.
Figure 27:
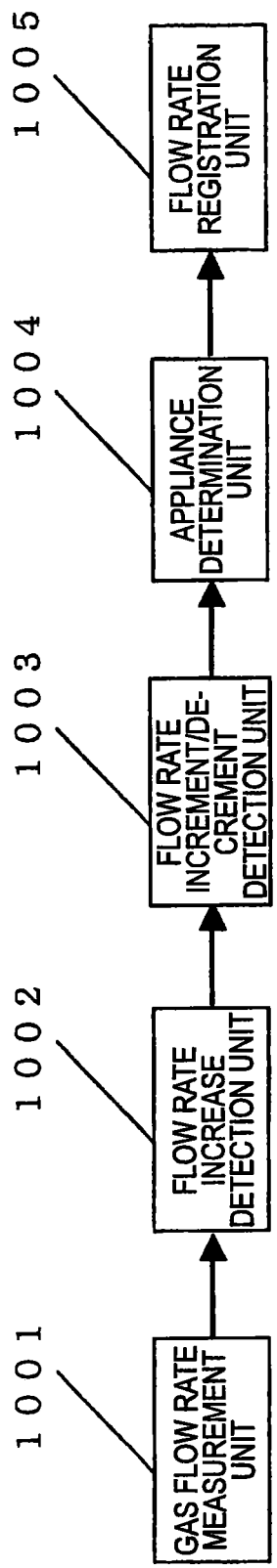
FIG. 27 is a block diagram of the related-art flow rate measuring apparatus.

In cases, such as those shown in FIGS. 24 and 25, large fluctuations arise in a flow rate measured while the appliances are operating. In such a case, many peaks are detected in connection with a differential flow rate as shown in FIG. 25, and extreme difficulty is encountered in performing determination. Therefore, when an appliance involving large flow variations is used, influence of flow variations is reduced by changing appliance determination conditions, thereby assuring the accuracy of determination. Specifically, absolute values are increased, as with Qs' and Qe', when compared with the threshold values Qs and Qe of the related-art determination conditions, whereby erroneous determination induced by variations in flow can be diminished.

The appliance involving large flow variations is an appliance such as a gas hot water supply. When such an appliance is operated, the deactivation determination conditions are changed as mentioned above, whereby determination conditions can be divided into conditions for a case where a large-flow appliance is operating and conditions for a case where a small-flow appliance is operating. Thus, there can be enhanced the accuracy of determination achieved when the small-flow appliance is operating.

Descriptions have been provided with an emphasis on determination of a deactivated appliance from among activated appliances. However, when activated appliances are associated with deactivated appliances after the deactivated appliance determination unit has determined deactivated appliances according to the deactivation determination conditions, the appliance correspondence unit 2010 can also determine activated appliances primarily based on information about deactivated appliances, thereby defining correspondence among appliances.

Specifically, there are cases where a flow rate achieved immediately after activation of an appliance is unstable and deemed to be indefinite as information for specifying an appliance. In such a case, an activated appliance is specified by use of a result of determination made by the deactivated appliance determination unit, whereby an appliance can be determined with high accuracy.

A case where a correspondence is defined primarily based on a result made by the activated appliance determination unit and a case where a correspondence is defined primarily based on a result pertaining to deactivated appliances are used in combination so as to suit the state of flow variations, whereby an appliance can be determined with higher accuracy.

As mentioned above, an appliance can be determined from operating states of activated appliances and deactivated appliances or operating states determined from differences between flow rates achieved before and after activation or deactivation of appliances, and appliance-specific flow rates can be calculated from respective flow rates or periods of operating states. As a consequence, customer service, such as setting of an appliance-specific fee and setting, in a prepaid card gas fee payment system, of a use fee for each gas appliance being used, can be implemented.

Although above descriptions are directed to the case of use of the ultrasonic flow meter, it is obvious that analogous advantages are yielded even by another instantaneous flow rate measurement unit. Use of the instantaneous flow meter makes it possible to set measurement timing at equal time intervals regardless of a flow rate; hence, an appliance having any flow rate can be determined at superior timing. Although described in connection with the gas meter, the flow rate measuring apparatus can be likewise used for an industrial flow meter and a water meter to determine an appliance connected to a downstream point with reference to the flow rate measuring apparatus, to measure an appliance-specific flow rate, and to perform maintenance of an appliance.

Although the present invention has been described in detail by reference to the specific embodiments, it is manifest to those skilled in the art that the invention be susceptible to various alterations or modifications without departing the spirit and scope of the invention. The present patent application is based on Japanese Patent Application No. 2005-210915 filed on Jul. 21, 2005; Japanese Patent Application No. 2006-289807 filed on Oct. 25, 2006; and Japanese Patent Application No. 2006-336813 filed on Dec. 14, 2006, contents of which are incorporated herein for reference.

INDUSTRIAL APPLICABILITY

As mentioned above, the flow rate measuring apparatus of the present invention and its program make it possible to accurately calculate a gas usage quantity (flow rate) achieved at respective times by gas appliances connected to downstream points with reference to a gas meter. Hence, the apparatus and program can be utilized in maintenance applications where proper use of gas appliances are monitored; make it possible to set gas use fees for respective gas appliances; and set, even in a prepaid card, a use fee for each gas appliance being used.

The flow rate measuring apparatus of the present invention successively grasps an instantaneous flow rate of an activated appliance by estimating an instantaneous flow rate based on a differential flow rate. Hence, it is possible to accurately detect a differential flow rate achieved when a gas appliance is deactivated and determine which one of operating gas appliance is deactivated. Hence, the flow rate measuring apparatus can be applied to a flow rate measuring apparatus that measures the usage flow rate of a gaseous matter except a gas and a fluid, such as water, for each appliance and that performs appliance-specific maintenance processing.

A flow rate measuring apparatus of the present invention has a flow rate measurement unit that measures a flow rate of a fluid flowing through a passage; an activated appliance determination unit for determining, based on an arbitrary specific interval differential flow rate calculated from a flow rate measured by the flow rate measurement unit at predetermined time intervals, an appliance to be used by being connected to the passage; a deactivated appliance determination unit that determines a deactivated appliance based on the specific interval differential flow rate and that determines a deactivated appliance by performing a selection from appliances determined to be activated based on deactivation determination conditions; and an appliance correspondence unit that defines correspondence between activated appliances and deactivated appliances. Since a deactivated appliance can be determined based on two pieces of information; namely, information about activated appliances and information about deactivated appliances, the range of appliances to be selected is narrow, and therefore a deactivated appliance can be determined with superior accuracy.

The invention claimed is:

1. A flow rate measuring apparatus comprising:
   a flow rate measurement unit that measures at given time intervals a flow rate flowing through a passage and that outputs measurement results as flow rate data;
   a computing unit that calculates a differential flow rate between a given time period and a pervious time period from the flow rate data output from the flow rate measurement unit;
   an appliance determination unit that determines use of one or more appliances from the differential flow rate computed by the computing unit; and
   an appliance flow rate calculation unit that calculates a usage flow rate for each of the one or more appliances based on a calculation method selected from among a plurality of different calculation methods, wherein the calculation method is selected based on a result of determination made by the appliance determination unit.

2. The flow rate measuring apparatus according to claim 1, wherein the appliance flow rate calculation unit determines a sequence in which a plurality of operating appliances are subjected to flow rate calculation, based on a flow rate calculation priority storage unit previously set under predetermined conditions; and calculates usage flow rates in a decreasing sequence of priority level from an appliance with a high priority level.

3. The flow rate measuring apparatus according to claim 2, wherein a higher priority level is set as the usage flow rate becomes smaller.

4. The flow rate measuring apparatus according to claim 2, wherein a higher priority level is set on an appliance which is less frequently changed in connection with the usage flow rate after activation.

5. The flow rate measuring apparatus according to claim 1, wherein the appliance flow rate calculation unit has a plurality of calculation processing units that calculate a flow rate in predetermined steps; and
   a usage flow rate for each appliance is calculated by switching the calculation processing units based on a number of times of flow rate measurements performed by the flow rate measurement unit when the appliance determination unit has detected a non-zero differential flow rate computed by the computing unit or during a time from when a transition to a state of determination of an appliance is effected and to when processing leaves the state of determination as well as based on the number of appliances used.

6. The flow rate measuring apparatus according to claim 1, wherein, when a large flow rate usage appliance starts operation while a small flow rate usage appliance is in operation, the appliance flow rate calculation unit compares flow rates measured by the flow rate measurement unit immediately before and after operation of the large flow rate usage appliance, to thus calculate a usage flow rate used by the small flow rate usage appliance in the middle of the large flow rate usage appliance being in operation.

7. A non-transitory computer readable medium encoded with a program for causing a computer to execute at least a portion of the flow rate measuring apparatus defined in claim 1.

8. The flow rate measuring apparatus according to claim 1, wherein the calculation method is selected based on a number of times flow rate measurement is performed by the flow rate measurement unit when the appliance determination unit calculates non-zero differential flow rate.

9. A flow rate measuring apparatus comprising:
   a flow rate measurement unit that measures flow rates in a passage;
   a differential flow rate detection unit that calculates a differential flow rate between a given time period and a previous time period from flow rates measured by the flow rate measurement unit;
   an activated appliance determination unit that determines an appliance activated by being connected to the passage from the differential flow rate calculated by the differential flow rate detection unit;
   an instantaneous flow rate estimation unit that calculates an instantaneous flow rate of an activated appliance by use of the differential flow rate; and
   a deactivated appliance determination unit that determines a deactivated appliance, based on the instantaneous flow rate calculated by the instantaneous flow rate estimation unit.

10. The flow rate measuring apparatus according to claim 9, wherein the instantaneous flow rate estimation unit calculates an instantaneous flow rate of an activated appliance determined based on a value of the differential flow rate.

11. The flow rate measuring apparatus according to claim 9, wherein the instantaneous flow rate estimation unit estimates an instantaneous flow rate of an appliance being used, by adding or subtracting a differential flow rate acquired later to or from a differential flow rate achieved when the activated appliance determination unit has determined activation.

12. The flow rate measuring apparatus according to claim 9, wherein the deactivated appliance determination unit determines a deactivated appliance by comparing an instantaneous flow rate calculated by the instantaneous flow rate estimation unit with a differential flow rate achieved at the time of deactivation.

13. The flow rate measuring apparatus according to claim 9, wherein calculating the instantaneous flow rate comprises:
    comparing a total flow rate measured by the flow rate measurement unit with the sum of instantaneous flow rates estimated by the instantaneous flow rate estimation unit; and
    correcting the sum based on a difference between the total flow rate and the sum.

14. The flow rate measuring apparatus according to claim 9, wherein the flow rate measurement unit uses an ultrasonic flow meter serving as an instantaneous flow measurement unit.

15. A flow rate measuring apparatus comprising:
    a flow rate measurement unit that measures a quantity of fluid flowing through a passage;
    an activated appliance determination unit that determines an appliance used by being connected to the passage, based on an arbitrary specific interval differential flow rate that indicates a differential value between a flow rate measured at a given time period in the past and a current given time;
    a deactivated appliance determination unit that determines a deactivated appliance based on the specific interval differential flow rate and that selects and determines a deactivated appliance from among activated appliances based on deactivation determination conditions; and
    an appliance correspondence unit that defines a correspondence between an activated appliance and a deactivated appliance,
    wherein, when there still remains an activated appliance despite the measured flow rate having come to zero, the deactivated appliance determination unit makes a determination that an activated appliance is deactivated at a point in time when the measured flow rate has come to zero.

16. The flow rate measuring apparatus according to claim 14, wherein there are adopted deactivation determination conditions for specifying an appliance by an absolute value of a differential flow rate.

17. The flow rate measuring apparatus according to claim 15, wherein the deactivated appliance determination unit is taken as deactivation determination conditions for specifying an appliance by a flow rate measured after deactivation.

18. The flow rate measuring apparatus according to claim 15, wherein, when there is no activated appliance in spite of determination of deactivation, the deactivated appliance determination unit determines an appliance of interest as an unknown appliance.

19. The flow rate measuring apparatus according to claim 15, wherein the deactivation determination conditions are changed by the activated appliance determined by the activated appliance determination unit.

20. The flow rate measuring apparatus according to claim 15, wherein the flow rate measurement unit uses an ultrasonic flow meter as the instantaneous flow rate measurement unit.

21. A flow rate measuring apparatus comprising:
    a flow rate measurement unit that measures a flow rate of a fluid flowing through a passage;
    an activated appliance determination unit for determining, based on an arbitrary specific interval differential flow rate that indicates a differential value between a flow rate measured by the flow rate measurement unit at a given time period in the past and a current given time period, an appliance to be used by being connected to the passage;
    a deactivated appliance determination unit that determines a deactivated appliance based on the specific interval differential flow rate and that determines a deactivated appliance based on deactivation determination conditions; and
    an appliance correspondence unit that defines correspondence between activated appliances and deactivated appliances under predetermined conditions,
    wherein, when there still remains an activated appliance despite the measured flow rate having come to zero, the deactivated appliance determination unit makes a determination that an activated appliance is deactivated at a point in time when the measured flow rate has come to zero.

* * * * *